United States Patent
Ren et al.

(10) Patent No.: US 9,898,668 B2
(45) Date of Patent: Feb. 20, 2018

(54) SYSTEM AND METHOD OF OBJECT DETECTION

(71) Applicant: QUALCOMM Incorporated, San Diego, CA (US)

(72) Inventors: Jianfeng Ren, San Diego, CA (US); Ruiduo Yang, San Diego, CA (US); Feng Guo, San Diego, CA (US); Shili Xu, San Diego, CA (US); Shuxue Quan, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 14/837,606

(22) Filed: Aug. 27, 2015

(65) Prior Publication Data
US 2017/0161569 A1    Jun. 8, 2017

(51) Int. Cl.
| | |
|---|---|
| *G06K 9/00* | (2006.01) |
| *G06K 9/32* | (2006.01) |
| *G08G 1/16* | (2006.01) |
| *B60T 7/22* | (2006.01) |

(52) U.S. Cl.
CPC ..... *G06K 9/00798* (2013.01); *G06K 9/00818* (2013.01); *G06K 9/325* (2013.01); *G06K 9/3233* (2013.01); *G08G 1/16* (2013.01); *B60T 7/22* (2013.01)

(58) Field of Classification Search
None
See application file for complete search history.

(56) References Cited

U.S. PATENT DOCUMENTS

| | | | |
|---|---|---|---|
| 6,853,738 B1 * | 2/2005 | Nishigaki | G01C 3/085 348/139 |
| 8,254,635 B2 | 8/2012 | Stein et al. | |
| 2002/0134151 A1 | 9/2002 | Naruoka et al. | |
| 2002/0159616 A1 | 10/2002 | Ohta | |
| 2007/0154067 A1 | 7/2007 | Laumeyer et al. | |
| 2007/0165910 A1 | 7/2007 | Nagaoka et al. | |
| 2011/0109476 A1 | 5/2011 | Porikli et al. | |
| 2012/0045119 A1 | 2/2012 | Schamp | |
| 2013/0049988 A1 | 2/2013 | Roeber et al. | |
| 2013/0101174 A1 | 4/2013 | Meis et al. | |

(Continued)

OTHER PUBLICATIONS

International Search Report and Written Opinion—PCT/US2016/040813—ISA/EPO—dated Oct. 11, 2016.

(Continued)

*Primary Examiner* — Delomia L Gilliard

(57) ABSTRACT

A system and method of object detection are disclosed. In a particular implementation, a method of processing an image includes receiving, at a processor, image data associated with an image of a scene. The scene includes a road region. The method further includes detecting the road region based on the image data and determining a subset of the image data. The subset excludes at least a portion of the image data corresponding to the road region. The method further includes performing an object detection operation on the subset of the image data to detect an object. The object detection operation performed on the subset of the image data is exclusive of the at least a portion of the image data corresponding to the road region.

46 Claims, 11 Drawing Sheets

(56) References Cited

U.S. PATENT DOCUMENTS

2014/0193033 A1* 7/2014 Huth .................. G06K 9/00818
                                                          382/103
2016/0210525 A1* 7/2016 Yang .................... G06K 9/0063
2016/0217335 A1* 7/2016 Levi ................... G06K 9/00805

OTHER PUBLICATIONS

Masuda H., et al., "Shape Reconstruction of Poles and Plates From Vehicle-Based Laser Scanning Data", The International Symposium on Mobile Mapping Technology, Jan. 1, 2013 (Jan. 1, 2013), XP055306203, 6 pages. Retrieved from the Internet: URL: http://www.ddm.mi.uec.ac.jp/papers/mmt2013.pdf 2013.pdf [retrieved on Sep. 28, 2016].

Zanin M.,"Localization of ahead Vehicles with on-board Stereo Cameras", 14th International Conference on Image Analysis and Processing, 2007. ICIAP 2007, Sep. 10-13, 2007—Modena, Italy, IEEE, Piscataway, NJ, USA, XP031152329, Sep. 1, 2007, pp. 111-116.

* cited by examiner

SYSTEM AND METHOD OF OBJECT DETECTION

I. FIELD

The present disclosure is generally related to object detection.

II. DESCRIPTION OF RELATED ART

An advanced driver assist system (ADAS) may be included in a vehicle and used to aid a driver of the vehicle. For example, the ADAS may receive data, such as image data, ultrasonic data, etc., and may process the data to detect objects and/or hazards. In response to detecting an object or hazard, the ADAS may initiate an action, such as notifying the driver or changing an operating characteristic (e.g., speed) of the vehicle. Similarly, autonomous vehicles may initiate an action in response to detecting an object or recognizing an object. Detecting objects, such as traffic signs, in an image may be difficult for the ADAS or autonomous vehicle to perform in real-time (or near real-time). For example, detecting traffic signs may be difficult because of viewpoint variations, lighting conditions (e.g., saturation, low contrast, etc.), motion-blur, occlusions, traveling velocity, etc.

III. SUMMARY

In a particular aspect, a device includes an image sensor configured to generate an image of a scene and a processor configured to receive the image. The processor is further configured to detect a road region of an image and to determine a subset of the image. As used herein, a "subset" of an image includes at least a first pixel of an image and excludes at least a second pixel of the image. In some examples, a "subset" of an image can alternatively be referred to as a region of interest (ROI). The subset excludes at least a portion of the road region. The processor is further configured to perform an object detection operation on the subset of the image to detect an object, such as a traffic sign, traffic control signal, outdoor advertisement, or other object, as illustrative, non-limiting examples. The object detection operation is performed on the subset of the image exclusive of (i.e., without performing the object detection operation on) the at least a portion of the road region.

In another particular aspect, a method of processing an image includes receiving, at a processor, image data associated with an image of a scene. The method further includes detecting a road region based on the image data and determining a subset of the image data. The subset excludes at least a portion of the image data corresponding to the road region. The method further includes performing an object detection operation on the subset of the image data to detect an object. The object detection operation performed on the subset of the image data is exclusive of the at least a portion of the image data corresponding to the road region.

In another particular aspect, computer readable storage device storing instructions that, when executed by a processor, cause the processor to perform operations including, in response to receiving an image of a scene, detecting a road region within the image. The operations further include determining a subset of the image. The subset excludes at least a portion of the road region. The operations further include searching the subset of the image exclusive of the at least a portion of the road region to detect an object.

In another particular aspect, an apparatus includes means for capturing an image of a scene including a road region and means for selecting a subset of the image. The subset excludes at least a portion of the road region detected in the image. The apparatus further includes means for performing an object detection operation on the subset of the image exclusive of the at least a portion of the road region to detect an object.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
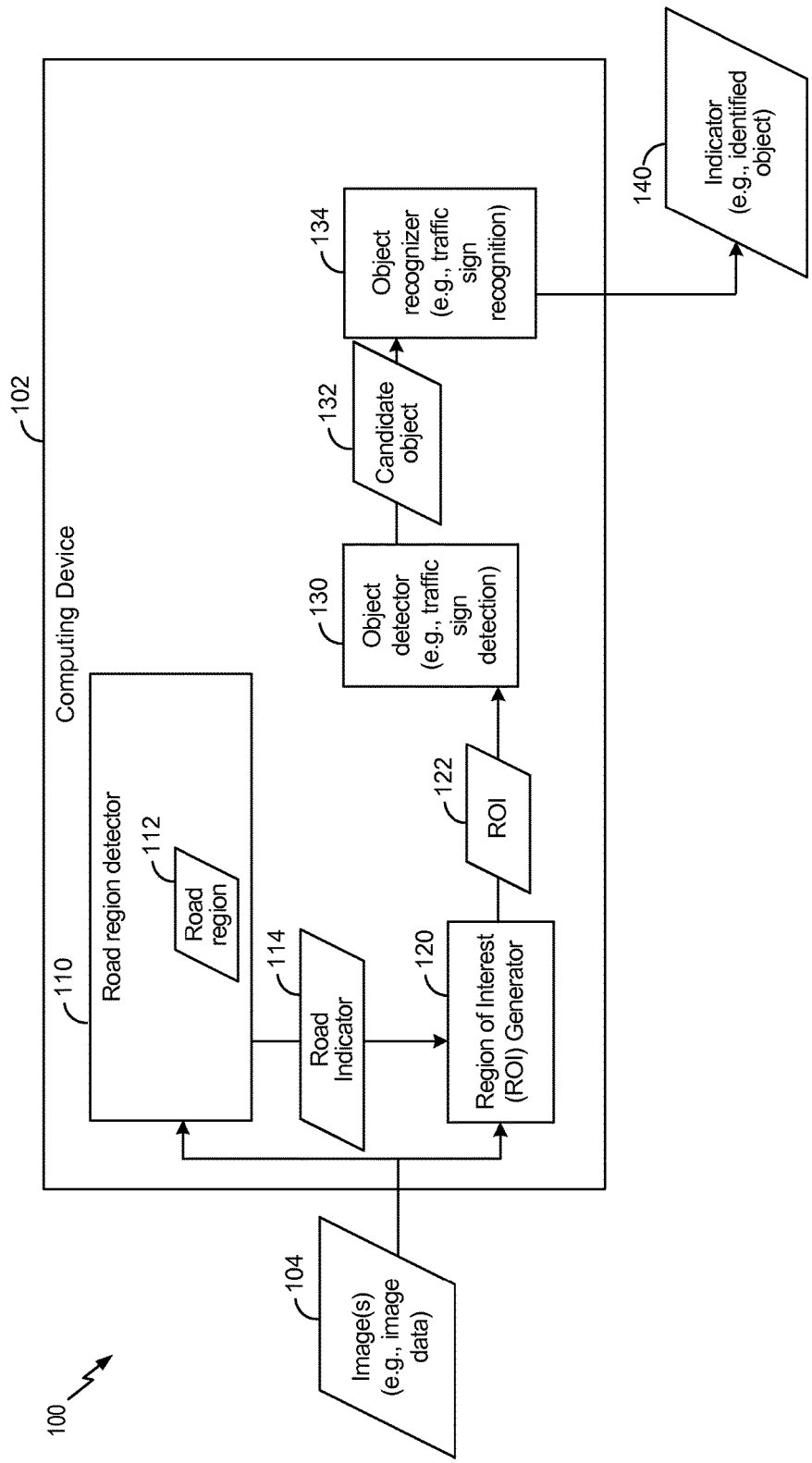
FIG. 1 is a diagram of a particular illustrative example of a system that supports image processing operations for object (e.g., sign) detection.

Particular aspects of the present disclosure are described below with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

The present disclosure is related to an image processing system, such as an object detection and optional object recognition system. Object detection may be performed to detect an object, such as a traffic sign or a traffic signal, included in an image. Object recognition can be performed to recognize a type or class of object detected (e.g., a type of traffic signal or a type of traffic sign—stop, yield, speed, construction, directional, etc.). The imaging processing systems and methods described herein may be associated with a vehicle. For example, the image processing system may receive an image that includes a representation of a road. The image may be received from a sensor included in or coupled to a vehicle, such as a camera, an infrared sensor, etc. The image processing system may perform lane/road detection on the image to detect a road region of the image. The road region, or a portion thereof, may be excluded from subsequent image processing operations, such as object detection, object recognition, etc. Thus, it is to be understood that as used herein, a detected "road region" of an image may include a portion or an entirety of the representation of the road in the image, and all or a portion of such a "road region" may be excluded from subsequent image processing. In some implementations, after detecting the road region, the image processing system may determine (e.g., select) at least a portion of the road region such that the at least the portion of the road region is less than or equal to a threshold size (e.g., a number of pixels, a number of pixel rows of the image, a fraction of the image, or a percentage of the image), a threshold distance (e.g., as determined based on the image), or both.

As explained above, the image processing system may exclude an entirety of, or a portion of, the road region from the image when performing object detection (e.g., when searching the image for a traffic sign, traffic signal, or both). In some implementations, the lane/road detection performed on the image may be performed at a lower resolution than the object detection. Accordingly, the lane/road detection may be performed faster than the object detection. By excluding at least a portion of the road region from a subsequent object detection operation (e.g., a traffic sign detection operation or a traffic signal detection operation), the object detection operation may be performed more quickly than if the entire image were searched for the object. By searching less than the entire image, the image processing system may perform object detection recognition more quickly, which may enable supporting real-time or near real-time object detection, object recognition, or both, such as for an ADAS.

Referring to FIG. 1, a particular illustrative example of an image processing system is disclosed and generally designated 100. The image processing system 100 may be associated with in a vehicle. For example, the image processing system 100 may be included in or coupled to an ADAS of a vehicle or an autonomous vehicle. Although one or more implementations are described herein with reference to a vehicle, this is not to be considered limiting. The techniques described herein may be used with electronic devices, mobile devices, gaming consoles, automotive system consoles (e.g., ADAS), wearable devices (e.g., personal mounted cameras), head mounted displays (HMDs), etc. Additional examples include, but are not limited to, robots or robotic devices, unmanned aerial vehicles (UAVs), and drones. Examples of vehicles can include a motor vehicle (e.g., a car, a truck, a motorcycle, a bus, or a train), a watercraft (e.g., a ship or a boat), an aircraft (e.g., an airplane or a helicopter), a spacecraft (e.g., a space shuttle), a bicycle, or another vehicle. A vehicle may be a wheeled vehicle, a tracked vehicle, a railed vehicle, an airborne vehicle, or a skied vehicle, as illustrative non-limiting examples. In some cases, a vehicle may be operated by one or more drivers. In other cases, a vehicle may be a computer-controlled vehicle, such as an autonomous vehicle. Furthermore, although one or more aspects may be described herein as including operations being performed at a vehicle, it should be understood that in other examples such operations can be performed in the "cloud" or outside of the vehicle.

The image processing system 100 includes a computing device 102 that is configured to receive an image(s) 104 and to optionally output an indicator 140 of an object. In some implementations, the image 104 may be received from a memory (not shown) or an image capture device (not shown). The memory, the image capture device, or both may be included in the computing device 102 or may be external to the computing device 102. To illustrate, the computing device 102 may include a mobile phone or a head mounted device that includes an image capture device, such as a camera.

The computing device 102 may include a road region detector 110, a region of interest (ROI) generator 120, an object detector 130, and, optionally, an object recognizer 134. The image processing system 100 receives an image 104 that is provided to the road region detector 110 and to the ROI generator 120. In some implementations, the image 104 may include (e.g., depict) a representation of a road. The image 104 may include image data for a plurality of pixels. In some implementations, the image data may include intensity values (e.g., grayscale values, red/green/blue (RGB) values, etc.) of the plurality of pixels. Additionally or alternatively, the image 104 may be included in an image stream received by the image processing system 100. In various implementations that include an image stream, the described road region detection and exclusion techniques may be performed for multiple images (e.g., frames) of the image stream, such as for every image or for every N images (where N is an integer greater than or equal to 1).

The road region detector 110 may perform lane/road detection (alternatively referred to as lane/road detection) on the image 104 to determine a road region 112 of the image 104. The road region 112 may include a portion or an entirety of the representation of the road included in the image 104. To detect the road region 112, the road region detector 110 may search the image 104 at a first resolution to detect the road region 112. To illustrate, the road region detector 110 may search the image 104 using a first window having the first resolution, such as a window size of 24 pixels×24 pixels, as an illustrative, non-limiting example. In some implementations, the road region detector 110 may perform lane/road detection to determine one or more lane marks within the image 104. For example, the road region detector 110 may determine coordinates of the one or more lane markers within the image 104. Based on the one or more lane markers, the road region detector 110 may determine a perimeter of a polygon that corresponds to the road region 112. For example, the road region detector 110 may determine the perimeter of the polygon so that the coordinates of the one or more lane markers are included in the polygon.

In some implementations, the road region detector 110 may determine at least a portion of the road region 112 and provide a road indicator 114 corresponding to the portion, or entirety, of the road region 112 to the ROI generator 120. In a particular implementation, the road indicator 114 is a list of pixels (e.g., pixel locations) within the road region 112 that are to be excluded from further image processing operations, as further described herein. Additionally or alternatively, the road indicator 114 may include one or more ranges of pixels (e.g., pixel locations) of the image 104 that are to be excluded from further image processing operations. In various implementations, the road region detector 110 may compare a size of the road region 112 to a threshold size. The threshold size may include or correspond to a number of pixels of the image 104, a percentage of the image 104, or a dimension between a top and a bottom of the image (e.g., a height). If the size of the road region 112 is less than or equal to the threshold size, the road indicator 114 may indicate an entirety of the road region 112. Alternatively, if the size of the road region 112 is greater than the threshold size, the road indicator 114 may indicate a portion of the road region 112 that is less than the entire road region 112. For example, the road region detector 110 may select a bottom portion of the road region 112 to be indicated by the road indicator 114 (as described with reference to FIG. 7), because of the reduced probability of detecting a sign in the portion of the road region 112 that is closest to a vehicle. In some implementations, the portion of the road region 112 that is selected may be less than or equal to the threshold size.

As another example, the road region detector 110 may determine the portion of the road region 112 based on determining whether the road region 112 extends beyond a threshold distance (e.g., measured from the vehicle). For example, the road region detector 110 may be configured to receive or determine distance information associated with the road region 112, such as based on global positioning system (GPS) information, ultrasound information, laser information, sonar information, information determined based on processing of the image 104, etc. The road region detector 110 may compare a distance (e.g., a farthest distance) of the road region 112 to a threshold distance. If the distance is less than or equal to the threshold distance, the road indicator 114 may indicate the entire road region 112. Alternatively, if the distance exceeds (e.g., is greater than) the threshold distance, the road indicator 114 may indicate a portion of the road region 112 that satisfies the threshold distance (e.g., is greater than or equal to the threshold distance away from the vehicle). To illustrate, if a representation of a road in the image 104 indicates that the road changes in elevation (e.g., when the vehicle is traveling on a decline or approaching an incline), overhead traffic signs (or overhead traffic signals) may be included in the detected road region 112 and may not be detectable if the entire road region 112 is excluded from the image 104. Accordingly, the portion of the road region 112 may be determined to account for topology of the road surface and to improve object detection results (e.g., sign detection results) and, optionally, object recognition results (e.g. sign recognition results).

As another example, the road region detector 110 may determine the portion of the road region 112 based on a lane that includes the vehicle. For example, the road region detector 110 may determine the portion of the road region 112 to include a lane in which the vehicle is traveling. Additionally or alternatively, road region detector 110 may determine the portion of the road region 112 to include one or more lanes associated with the same direction of travel as the vehicle. As an illustrative, non-limiting example, if the vehicle is traveling on a divided highway, the portion may include the portion of the divided highway on which the vehicle is travelling and may not include other portions of the divided highway having traffic in an opposite direction of travel as the vehicle.

In some implementations, the road region detector 110 may be configured to receive data, such as mapping data (e.g., location data), environmental data (e.g., weather data, elevation data), and/or vehicular data (e.g., speed, incline/decline data). The road region detector 110 may detect the road region 112 or determine the road indicator 114 based on the data. As an illustrative, non-limiting example, if the data indicates that a vehicle is traveling on a decline having a slope that is greater than or equal to a threshold, the road region detector 110 may limit a size of the road region 112, as described with reference to FIG. 7. To illustrate, the road indicator 114 may indicate a portion (e.g., a fraction) of the road region 112 or the image 104 that is closest to the vehicle. Additionally or alternatively, if the data indicates that the vehicle is approaching or at an intersection, the road indicator 114 may indicate a portion of the road region 112 that is determined based on a direction of travel of the vehicle. To illustrate, the road region 112 may include a first road corresponding to a direction of travel of the vehicle and a second road that is a cross street to the first road. The road indicator 114 may indicate the portion of the road region 112 that includes at least a portion of the first road but excludes the second road, as described with reference to FIG. 8.

The ROI generator 120 may receive the image 104 and the road indicator 114. The ROI generator 120 may be configured to determine, based on the road indicator 114, a subset of the image 104 (alternatively referred to herein as a ROI 122) to be provided to the object detector 130. To generate the ROI 122, the ROI generator 120 may exclude the road region 112, or portion(s) thereof (as indicated by the road indicator 114), from the image 104. To illustrate, the image 104 may be associated with a plurality of stored pixel values and the ROI generator 120 may overwrite a set of pixel values corresponding to the road region 112, or portion thereof, that is to be excluded. For example, the set of pixel values may be overwritten with a predetermined value, such as being overwritten with all 1's or all 0's. Overwriting the set of pixel values with all 1's or all 0's may be equivalent to excluding (e.g., removing) at least the portion of the road region 112 from the image 104 (e.g., because regions of all 1's or all 0's may automatically be skipped by subsequent image processing operations). The ROI generator 120 may provide the ROI 122, or an indication thereof, to the object detector 130.

In some implementations, the image 104 may be provided to the road region detector 110 and to the ROI generator 120 and the ROI generator 120 may begin processing the image 104 to generate the ROI 122 in parallel with the road detector region 112 detecting the road region 122. For example, the ROI generator 120 may perform one or more operations in parallel with the road region detector 110 detecting the road region 112. To illustrate, the ROI generator 120 may determine whether to exclude one or more regions from the image 104 and may exclude the one or more regions from the image 104. In response to receiving the road indicator 114, the ROI generator 120 may exclude at least a portion of the road region 112 from the image 104, which may complete generation of the ROI 122. In other implementations, the road region detector 110 and the ROI generator 120 may be configured serially. For example, the image 104 may be provided to the road region detector 110 and not to the ROI generator 120. The road region detector 110 may detect the road region 112 and provide the road indicator 114 to the ROI generator 120 along with the image 104.

The object detector 130 may be configured to search the ROI 122 to detect an object within the ROI 122. In some examples, the object detector 130 may detect the objects based on performing one or more detection algorithms, such as image segmentation, color segmentation, image filtering, features from accelerated segment test (FAST), speeded up robust features (SURF), scale-invariant feature transform (SIFT), corner detection, edge detection, blob detection, etc. In some implementations, when the set of pixel values are overwritten to exclude the road region 112 (or portion thereof), the object detector 130 may be configured to skip processing areas of the image 104 that correspond to pixel values of all 1's or all 0's.

The object detected by the object detector 130 may include or correspond to a traffic sign or a traffic signal, as an illustrative, non-limiting example. For example, the object detector 130 may search (e.g., scan) the ROI 122 to detect a candidate object(s) 132. In some examples, the object detector 130 may search the ROI 122 at a second resolution to detect the object. To illustrate, the object detector 130 may search the ROI 122 using a second window having the second resolution, such as a window size of 15 pixels×15 pixels, as an illustrative, non-limiting example. The second resolution may be a higher resolution than the first resolution used by the road region detector 110 to detect the road region 112. In some implementations, the object detector 130 may divide the ROI 122 into a plurality of windows, such as multiple 15 pixel×15 pixel windows.

In a particular implementation, the object detector 130 may determine a color value of each pixel window and may compare the determined color values to color values known to be associated with traffic signs. For example, known sign color values for the United States of America may include a red color associated with a stop sign, a yellow color associated with a warning sign, an orange color associated with a construction sign, a white color associated with a speed sign, a green color associated with a navigation sign, etc., as illustrative, non-limiting examples. In some implementations, the color value of a particular pixel window may be an average of multiple color values of multiple pixels included in the particular pixel window. In other implementations, the color value of a particular pixel window may be a histogram of multiple color values of multiple pixels included in the particular pixel window. Additionally or alternatively, the object detector 130 may be configured to perform an edge detection operation on the ROI 122. In some implementations, the object detector 130 may receive the image 104 and may perform edge detection on an entirety of the image 104. In other implementations, the edge detection operation may be performed by another component, such as the road region detector 110, and a result of the edge detection operation may be provided to the object detector 130. Based on a result of the edge detection operation, the object detector 130 may attempt to detect a known object (e.g., sign) shape. For example, in the case of road signs, the known object shape may include a rectangle, a square, a diamond, etc., as illustrative, non-limiting examples.

The object recognizer 134 may be configured to receive the candidate object 132 (or an indication thereof) and to perform an object recognition operation on the candidate object 132. For example, the object recognition operation may include a traffic sign recognition operation or a traffic signal recognition operation, as an illustrative, non-limiting example. In a particular implementation, the object recognizer 134 includes or has access to a set of classifiers. Each classifier of the set of classifiers may correspond to a different object, such as a different traffic sign or a different traffic signal. The object recognizer 134 may compare the candidate object 132 (or features corresponding thereto, as determined by the object detector 130) to the set of classifiers. If the candidate object 132 matches a particular classifier of the set of classifiers, the object recognizer 134 may generate an indicator 140 associated with an identified object, e.g., a recognized object.

In response to the object recognizer 134 identifying the object, the object recognizer 134 may optionally output an indicator 140 of the identified object. The indicator 140 may indicate an object type, a location of the object (e.g., relative to the vehicle), or both, as illustrative non-limiting examples. For a traffic sign, the object type may indicate that the traffic sign is a regulatory sign (e.g., a stop sign, a speed limit sign, etc.), a warning sign, a marker sign, a guide and information sign, a recreational and/or a cultural interest sign, etc., as illustrative, non-limiting examples. For a traffic signal, the object type may indicate a current state (e.g., indication) provided by the traffic signal, such as a stop signal, a turn signal, a go signal, etc., as illustrative, non-limiting examples. In some implementations, the indicator 140 may be provided to a controller, such as a controller of a vehicle that includes the computing device 102, as described with reference to FIG. 2. For example, the controller may be included in an ADAS or an autonomous vehicle and, in response to the indicator 140, the ADAS or the autonomous vehicle may initiate at least one action, such as braking, to be performed by the vehicle. As another example, the controller may be included in an audio/visual system and, in response to the indicator 140, the controller may initiate a visual presentation of the indicator 140 via a display, an audio presentation of the indication via an audio system, or both. In some implementations, the display may be included in a dashboard of the vehicle. In other implementations, the display may be included in a wearable device (e.g., a head mounted device (HMD)) or may be a heads-up display (HUD) that is included on or in the windshield of a vehicle. In implementations where the computing device 102 does not include the object recognizer 134, the object detector 130 (e.g., the computing device 102) may output an indicator associated with the candidate object 132. The indicator that may be provided by the object detector 130 may include information as described with reference to the indicator 140 provided by the object recognizer 134.

During operation, the computing device 102 may receive the image 104. In other implementations, if the computing device 102 includes an image capture device, such as a camera, the computing device may generate the image 104 (e.g., image data). The image 104 may be provided to the road region detector 110 and to the ROI generator 120. The road region detector 110 may detect the road region 112 within the image 104. Based on the detected road region 112, the ROI generator 120 may generate the ROI 122 by excluding at least a portion of the road region 112 from the image 104. The ROI 122 may be provided to the object detector 130, which may perform object detection on the ROI 122. In some implementations, the computing device 102 includes the object recognizer 134 that may output the indicator 140.

In some implementations, the ROI generator 120 may exclude other portions of the image 104, in addition to at least the portion of the road region 112, to generate the ROI 122. For example, the ROI generator 120 may exclude another portion of the image 104 that is positioned in the image 104 above the road region 112, as described with reference to FIG. 4. In some examples, region(s) above the road region 112 may be excluded by the ROI generator 120 when the vehicle is in locations where a likelihood of detecting an overhead sign is reduced, such as in a rural area. Additionally or alternatively, the ROI generator 120 may be configured to receive data, such as mapping data (e.g., location data), environmental data (e.g., weather data, elevation data), and/or vehicular data (e.g., speed, incline/decline data). The ROI generator 120 may exclude one or more portions of the image 104, in addition to excluding at least a portion of the road region 122, based on the received data.

To illustrate, if the data indicates that the vehicle is traveling on a road that is next to a feature (e.g., a physical feature, such as a body of water or a valley), the ROI generator 120 may exclude a portion of the image 104 that is associated with the feature. By excluding additional portion(s) of the image 104, a size of the ROI 122 may be further reduced, which may result in object detection being performed more quickly. Additionally or alternatively, because object detection is being performed on less than the entire image 104, the object detection may be performed at a higher resolution and in a shorter amount of time than if the entire image were being searched for an object. By performing the object detection at the higher resolution, the object detection operation may be more accurate, more reliable, and more likely to detect one or more objects in the image 104. As another example, the ROI generator 120 may exclude a portion of the image 104 that is closest to a vehicle in addition to excluding the road region 112 or a portion thereof, as described with reference to FIG. 5. For example, traffic signs are typically not included in a portion of the image 104 that is closest to the vehicle, such as a bottom quarter or a bottom third, of an image captured by a vehicle camera.

In some implementations, the road region 112 (or data associated therewith) may be provided to the object detector 130. The object detector 130 may be configured to perform text detection on the road region 112 to detect text that may be present on a representation of a road included in the image 104, as described with reference to FIG. 9. Although the objector detector 130 has been described as being configured to perform text detection, in other implementations, the computing device 102 may include a text detector that is distinct from the object detector 130. In some implementations, the text detection may be performed on an entirety of the road region, or a portion thereof, that is in the same direction of travel as the vehicle. The object detector 130 may search the road region 112 for text at a third resolution. For example, the object detector 130 may search the road region 112 using a third window having a third resolution. In some implementations, the third resolution may be a lower resolution than the second resolution. Additionally or alternatively, the third resolution may be lower than, higher than, or the same as the first resolution used by the road region detector 110 to detect the road region 112. Additional examples of excluding road region portions are further described with reference to FIGS. 3-9.

Although the computing device 102 has been described as detecting a road region 112 and excluding the road region 112 (or portion(s) thereof) from the image 104 to determine the ROI 122, in other implementations, the computing device 102 may detect (or optionally identify) a particular object and exclude the particular object from the image 104 to determine the ROI 122. In some implementations, the particular object may be excluded from the image 104 instead of or in addition to at least the portion of the road region 112 being excluded from the image 104.

The particular object may be associated with a portion of the image 104 that has a low likelihood of overlapping an object of interest, e.g., a sign associated with the road. For example, the particular object may correspond to the sky, a body of water, to another vehicle that is in front of and traveling in the same direction of travel as the vehicle, or to a vehicle traveling in an opposite direction of travel as the vehicle. In some implementations, the other vehicle is in the same lane as the vehicle. The other vehicle may be detected (or optionally identified) in the image 104 and excluded from the image 104 by the ROI generator 120 to generate the ROI 122. Alternatively, the other vehicle may be detected (or optionally identified) in an image that is received by the computing device 102 prior to the image 104, such as a second image that precedes the image 104 in a stream of images. To illustrate, the other vehicle may be detected in the second image by the object detector 130 (or optionally identified in the second image by the object recognizer 134) and the object detector 130 (or optionally the object recognizer 134) may provide an indication of the other vehicle to the ROI generator 120.

In some implementations, the computing device 102 may be configured to detect the particular object (e.g., another vehicle traveling in the same direction of travel) included in the image 104. The ROI generator 120 may be configured to exclude the particular object from the image 104 to determine the ROI 122. The computing device 102 may perform object detection, and optionally object recognition, on the ROI 122 to detect an object, such as a traffic sign or a traffic signal, as illustrative, non-limiting examples. In some implementations, object recognition may be performed on a portion of the ROI 122 that corresponds to the detected object and not on an entirety of the ROI 122.

In some implementations, the computing device 102 may include one or more memories (not shown). For example, the computing device may include a memory that is configured to receive and store the image 104. The memory may be accessible by one or more components of the computing device 102, such as the road region detector 110, the ROI generator 120, the object detector 130, or (optionally) the objet recognizer 134. In some implementations, the image 104 (e.g., the image data) stored in the memory may be modified by one or more components of the computing device 102. For example, in response to receiving the road indicator 114 from the road region detector 110, the ROI generator 120 may modify the image 104 stored at the memory to exclude at least a portion of the road region 112. To illustrate, the ROI generator 120 may overwrite a portion of image data (e.g., the image 104), where the portion corresponds to at least a portion of the road region 112 to be excluded.

In a particular implementation of the image processing system 100, the computing device 102 may be configured to receive image data associated with the image 104 of a scene. The computing device 102 may also be configured to detect the road region 112 based on the image data and to determine a subset of the image data. The subset excludes at least a portion of the image data corresponding to the road region 112. The computing device 102 may further be configured to perform an object detection operation on the subset of the image data to detect an object. The object detection operation may be performed on the subset of the image data exclusive of the at least a portion of the image data corresponding to the road region 112. Stated differently, the object detection operation may be performed on the subset of the image data and may not be performed on the at least a portion of the image data corresponding to the road region 112.

Thus, the computing device 102 may be configured to exclude the road region 112, or a portion thereof, from the image 104 to generate a subset of the image 104 (e.g., the ROI 122). The computing device 102 may search the ROI 122 to detect an object included in the ROI 122. By excluding at least a portion of the road region 112 from the image 104 that is searched for an object (e.g., a traffic sign(s) or a traffic signal(s)), the image 104 may be searched more quickly than if an entirety of the image 104 were searched. By searching less than the entirety of the image 104, the image processing system 100 may perform object detection (and optionally object recognition), more quickly (e.g., to support real-time or near real-time object detection). For example, performing object detection within the ROI may save one-third (or more depending on relative sizes of the ROI and the image) of the time used to perform object detection within the entire image.

Figure 2:
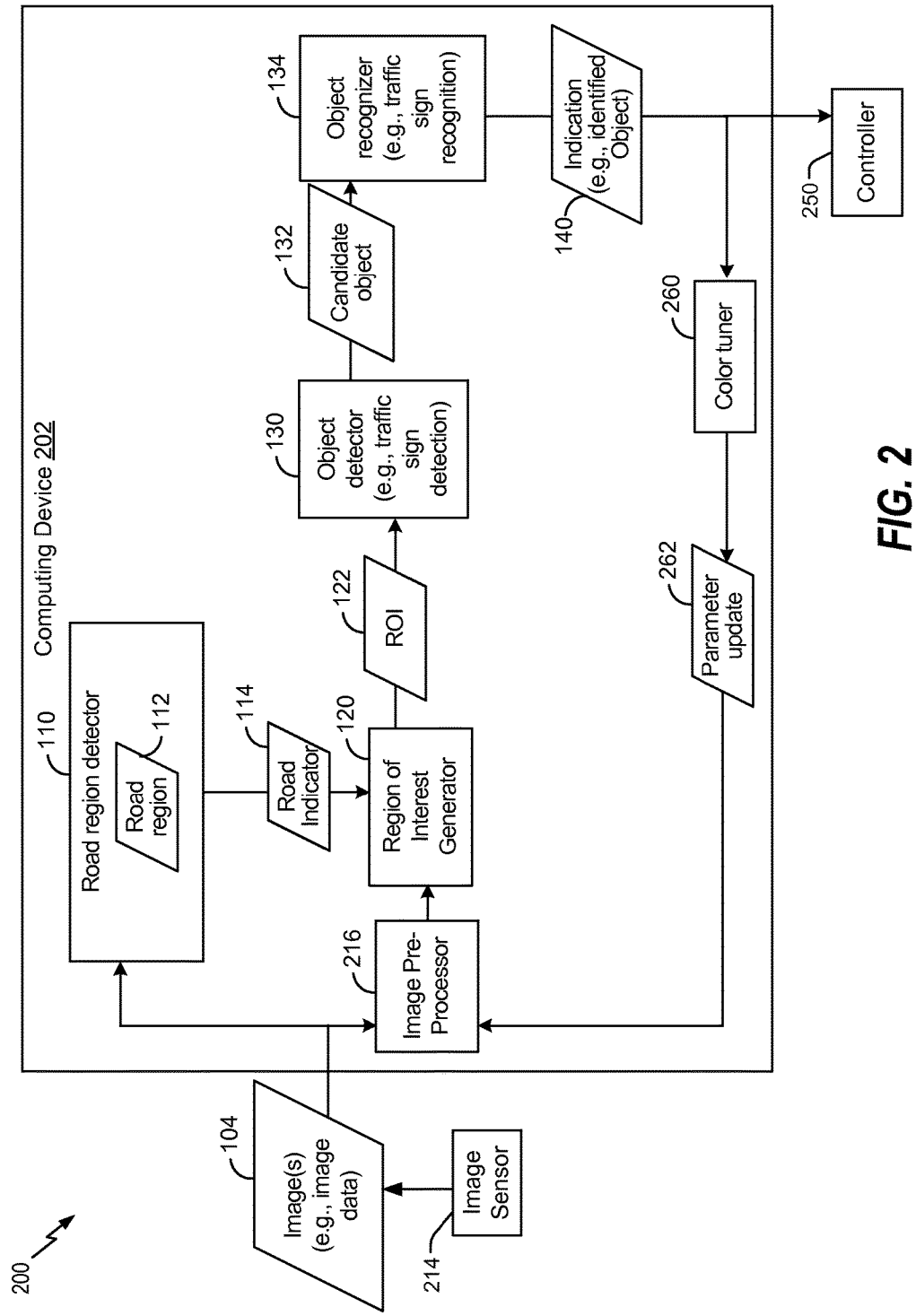
FIG. 2 is another diagram of the system of FIG. 1 that illustrates examples of image processing.

Referring to FIG. 2, a particular illustrative example of an image processing system is disclosed and generally designated 200. The image processing system 200 may include or correspond to the image processing system 100 of FIG. 1. The image processing system 200 may be included associated with a vehicle. For example, the image processing system 200 may be included in or coupled to an ADAS or an autonomous vehicle. In another example, the image processing system 200 may be included in a system or device, such as a wearable device (e.g., a HMD) used by a passenger or a driver of a vehicle. The image processing system 200 includes an image sensor 214, the computing device 202, and a controller 250.

The image sensor 214 may include a camera that is configured to generate the image(s) 104. For example, the camera may be mounted to the vehicle and configured to generate an image frame or a stream of image frames. As another example, the camera may be mounted to another device or system, such as a HMD used by a passenger or a driver of the vehicle, a drone, a satellite, another vehicle, an infrastructure camera system (e.g., a surveillance system), etc. The image sensor 214 may provide the image 104 to the computing device 202, as shown.

The computing device 202 may include the road region detector 110, an image pre-processor 216, the ROI generator 120, the object detector 130, (optionally) the object recognizer 134, and a color tuner 260. The image 104 may be received by the computing device 202 and routed to the road region detector 110 and to the image pre-processor 216.

The image pre-processor 216 may be configured to process the image 104 based on one or more parameters, such as a color tuning parameter, a white balance parameter, a brightness parameter, or a combination thereof, as illustrative, non-limiting examples. To illustrate, the image pre-processor 216 may apply the white balance parameter to the image 104 to adjust (e.g., increase or decrease) a white balance of the image 104. After adjusting the image 104, the image pre-processor 216 may provide the image 104 (e.g., an adjusted version of the image 104) to the ROI generator 120. One or more operations performed by the image pre-processor 216 may be performed in parallel with, such as at least partially currently with, the road region detector 110 detecting the road region 112 (or a portion thereof) for exclusion by the ROI generator 120.

In some implementations, the image pre-processor 216, the ROI generator 120, or both, may be configured to operate in parallel with the road region detector 110. For example, the image pre-processor 216 may perform one or more operations in parallel with the road region detector 110 detecting the road region 112. In other implementations, the computing device 102 may be configured such that the image 104 is received at the image pre-processor 216 and the image pre-processor 216 provides a pre-processed version of the image 104 to the road region detector 110, the ROI generator 120, or both. For example, in a first implementation, the image pre-processor 216 may provide the pre-processed version of the image 104 to both the road region detector 110 and the ROI generator 120. The road region detector 110 and the ROI generator 120 may be configured to perform operations in parallel on the pre-processed version of the image 104. As another example, in a second implementation, the image pre-processor 216 may provide the pre-processed version of the image 104 to the road region detector 110 (and not to the ROI generator 120). The road region detector 110 and the ROI generator 120 may be configured serially such that the road region detector 110 may detect the road region 112 using the pre-processed version of the image 104 and may provide the road indicator 114 and the pre-processed version of the image 104 to the ROI generator 120.

The object detector 130 may perform an object detection operation, and the object recognizer 134 may optionally perform an object recognition operation, as described with reference to FIG. 1. In response to detecting an object, and optionally recognizing the object, the object detector 130 (or the object recognizer 134) may generate the indicator 140 associated with the object. The indicator 140 may be provided to the controller 250 and to the color tuner 260.

The controller 250 may be configured to initiate an operation to be performed by another system of a vehicle associated with the image processing system 200. For example, the controller 250 may be configured to initiate an operation of an ADAS included in the vehicle or an operation of an autonomous vehicle. To illustrate, if the indicator 140 indicates that the object (e.g., a stop sign) has been detected or identified in the image 104, the controller 250 may initiate a braking operation to be performed by the ADAS or the autonomous vehicle. In some implementations, the controller 250 may be coupled to an audio/visual system of the vehicle. The audio/visual system may include a speaker, a display (e.g., a HUD), or both, as illustrative, non-limiting examples. In response to the indicator 140, the controller 250 may be configured to initiate a visual presentation of the indicator 140 via the display (e.g., a visual depiction of the stop sign in the HUD), an audio presentation of the indication via the speaker (e.g., "stop sign ahead"), or both.

The color tuner 260 may be configured to receive the indicator 140 associated with the object and to determine an image quality characteristic of the object. As used herein, an "image quality characteristic" may include a color value or histogram of color values, a white balance value or histogram of white balance values, a brightness value or histogram of brightness values, a blurriness value or histogram of blurriness values, etc., as illustrative, non-limiting examples. For example, the color tuner 260 may determine the image quality characteristic of the object using the image 104, an adjusted version of the image 104 output by the image pre-processor 216, or the ROI 122. The color tuner 260 may compare the image quality characteristic to a threshold image quality characteristic, such as a known representation of the object. For example, the threshold image quality characteristic may correspond to a high quality image of the object identified by the indicator 140.

To illustrate, if the object is a stop sign, the threshold image quality characteristic may correspond to a red color value of a high quality image of the stop sign. Based on the comparison of the image quality characteristic to the image quality characteristic threshold, the color tuner 260 may determine a parameter update to be provided to the image pre-processor 216. The image pre-processor 216 may apply the parameter update to change the one or more parameters applied by the image pre-process (e.g. to one or more subsequent image frames). As an illustrative example, if the color tuner 260 determines that the object, as included in the ROI 122, is too dark, the color tuner 260 may generate the parameter update 262 to cause the image pre-processor 216 to increase a brightness parameter, so that subsequent images processed by the road region detector 110 and/or the ROI generator 120 are brightened relative to what is captured by the image sensor 214. Thus, in this example, the image pre-processor 216 may apply the brightness parameter to a second image that is received after the image 104. By increasing the brightness parameter, detection (and optionally identification) of the object in the second image may be improved.

Thus, the computing device 202 of FIG. 2 may be configured to provide feedback, such as the parameter update 262, to the image pre-processor 216 in response to the object being detected (or optionally identified) in the image 104. By updating the one or more parameters of the image pre-processor 216, detection (or optionally identification) of the object in images received after the image 104 may be improved (e.g., may be performed faster and/or with increased accuracy).

Referring to FIGS. 3-9, illustrative examples of image processing to exclude at least a portion of a road region from an image are depicted. Each of the examples of image processing described with reference to FIGS. 3-9 may be performed by the image processing system 100 of FIG. 1 or the image processing system 200 of FIG. 2, for example.

Figure 3:
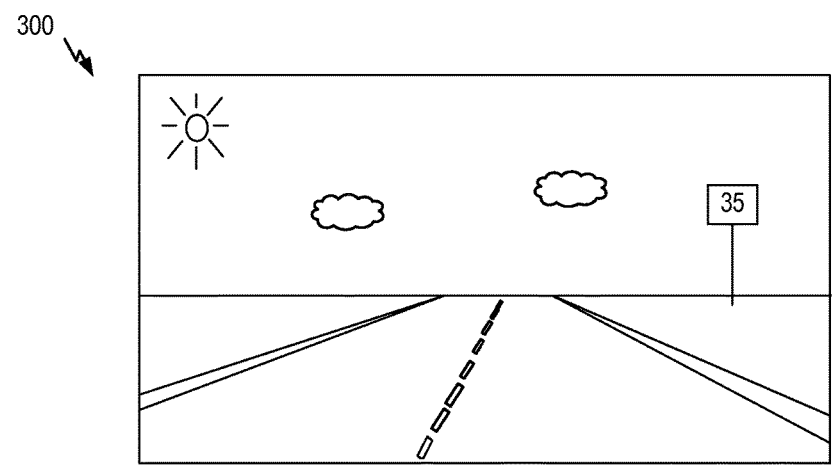
FIG. 3 is a diagram of a particular illustrative example of excluding at least a portion of a road region from an image.
Figure 3:
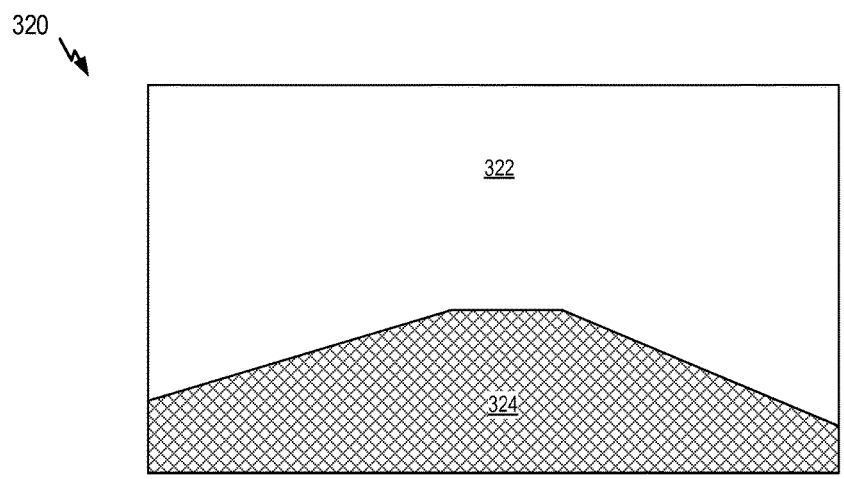
Figure 3:
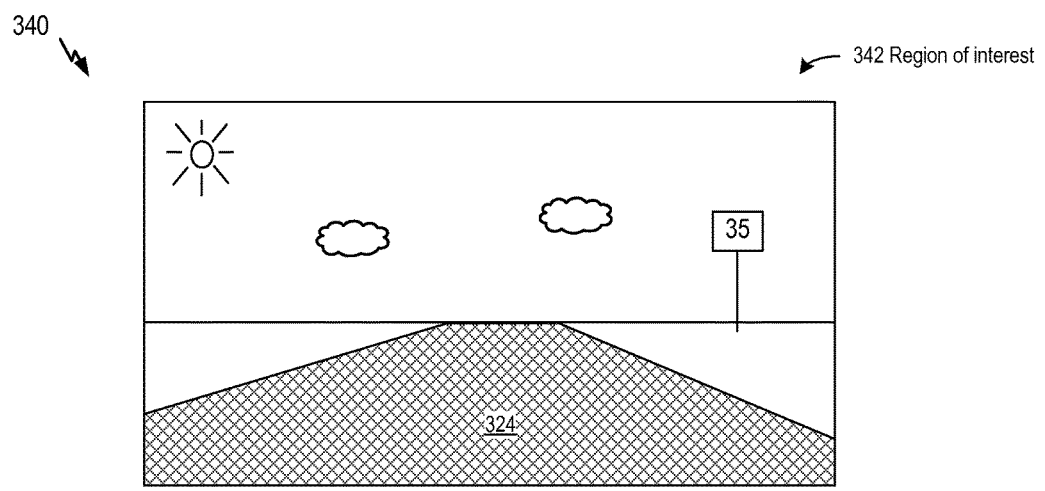

Referring to FIG. 3, an illustrative first example of image processing to exclude at least a portion of a road region from an image is depicted. An image including a representation of a road that is associated with a road region, such as the road region 112 of FIG. 1, is depicted at 300. The image 300 may include or correspond to the image 104 of FIG. 1.

A first representation of the image 300 is designated 320. The first representation 320 includes a first region 324 and a second region 322. As shown, the second region 322 is a subset of the image 300 that excludes the first region 324. The first region 324 may include all or a portion of the road region that is in the field of view of the vehicle camera. The second region 322 may correspond to a ROI, such as the ROI 122 of FIG. 1, in which object detection and optionally object recognition may be performed.

A second representation 340 depicts the first region 324 that is to be excluded from the image 300 and a resulting ROI 342 (the non-hatch-shaded region) that is to be searched. For example, the ROI 342 may be searched by the object detector 130 of FIG. 1 to detect one or more objects (e.g., one or more candidate objects). Although the second representation 340 indicates that an entirety of the road is excluded from the image 300 to generate the region of interest 342, in other implementations, less than an entirety of the road may excluded from the image 300. For example, the region of interest 342 may be determined by only excluding a portion of the road, such as a portion of the road that is in a direction of travel of the vehicle.

Figure 4:
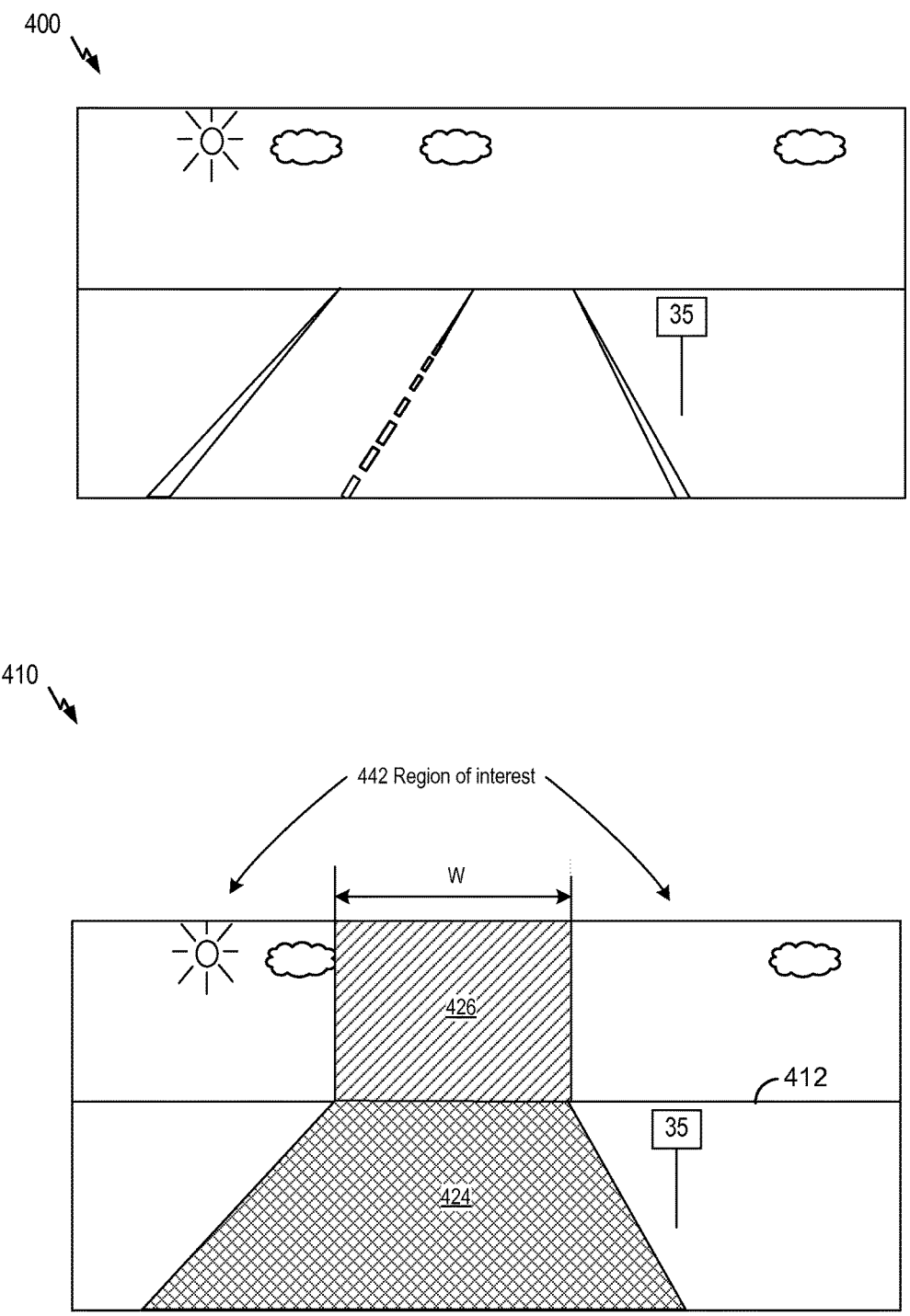
FIG. 4 is a diagram of a particular illustrative example of excluding at least a portion of a road region from an image during object (e.g., sign) detection.

Referring to FIG. 4, an illustrative second example of image processing to exclude at least a portion of a road region from an image is depicted. An image including a representation of a road that is associated with a road region, such as the road region 112 of FIG. 1, is depicted at 400. The image 400 may include or correspond to the image 104 of FIG. 1.

A representation of the image 400 that indicates a subset of the image 400 to be searched to detect an object is designated 410. The representation 410 includes a first region 424, a second region 426, and a ROI 442. The first region 424 may include all or a portion of the road region that is in the field of view of the vehicle camera. In the example of FIG. 4, the second region 426 is a portion of the image 400 that is positioned above the first region 424. For example, a width (W) of the second region 426 may be determined based on a portion of a horizon 412 that is in contact with the first region 424. The first region 424 and the second region 426 may be excluded from the image 400 to determine the ROI 442.

In some implementations, the second region 426 may be selectively excluded based on data associated with the image 400, such as mapping data (e.g., location data), environmental data (e.g., topographical data), and/or vehicular data (e.g., speed, incline/decline data). For example, the second region 426 may be selectively excluded when the data indicates that a likelihood of an overhead sign above the first region 424 (e.g., the road region) is low. To illustrate, if the data indicates that the image 400 of a location in a rural (e.g., farming) area, a determination may be made that a likelihood of an overhead sign is low and the second region 426 may be excluded from the image 400. As another example, the second region 426 may correspond to a large vehicle (e.g., truck) that is partially obstructing a field of view of a vehicle camera. By excluding the second region 426 in addition to the first region 424, a size of the ROI 442 may be further reduced. By reducing the size of the ROI 442, an object detection operation performed on the ROI 442 may be performed more quickly than if the ROI 442 did not exclude the second region 426.

Figure 5:
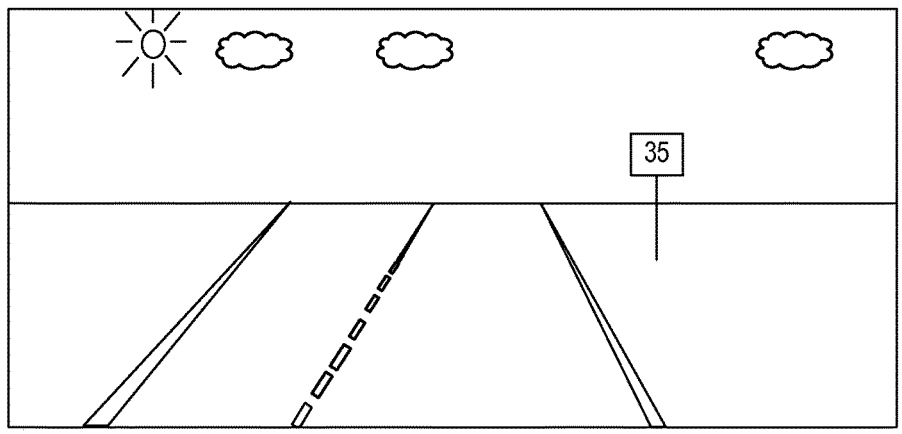
FIG. 5 is a diagram of another particular illustrative example of excluding at least a portion of a road region from an image during object (e.g., sign) detection.
Figure 5:
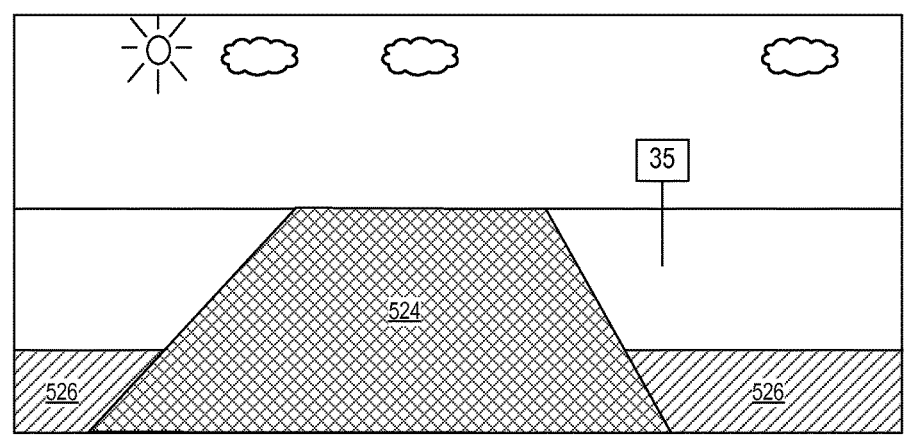

Referring to FIG. 5, an illustrative third example of image processing to exclude at least a portion of a road region from an image is depicted. An image including a representation of a road that is associated with a road region, such as the road region 112 of FIG. 1, is depicted at 500. The image 500 may include or correspond to the image 104 of FIG. 1.

A representation of the image 500 that indicates a subset of the image 500 to be searched to detect an object is designated 520. The representation 520 includes a first region 524, second regions 526, and a ROI 542 that is to be searched for object(s). The first region 524 may include all or a portion of the road region that is in the field of view of the vehicle camera. The second regions 526 may be associated with a portion of the image 500 that is closest to the vehicle. The portion of the image 500 that is closest to the vehicle, such as a bottom half, a bottom third, or a bottom quarter, of the image 500 may be unlikely to include an object, such as a traffic sign or a traffic signal. For example, as a vehicle approaches a traffic sign, the traffic sign becomes larger and, based on a height of the traffic sign above the ground, the traffic sign is positioned in an upper portion (e.g., a top half, a top two-thirds, etc.) of a field of view of a camera mounted to a vehicle. Accordingly, the second regions 526 may be excluded from the image 500 along with the first region 524. By excluding both of the first region 524 and the second regions 526 from the image 500, a size of the ROI 542 may be reduced as compared to only excluding the first region 524. By reducing the size of the ROI 542, an object detection operation performed on the ROI 542 may be performed more quickly than if the ROI 542 did not exclude the second regions 526.

In other implementations, another portion of the image 500 may be excluded in addition to or other than the portion of the image that is closest to the vehicle. For example, a top portion, such as a top one-tenth or top half, of the image 500 may be excluded to determine the region of interest 542. To illustrate, based on a focal characteristic of a camera that is used to generate the image 500, objects that are far away may be difficult to classify if an object recognition operation is performed. Accordingly, the top portion of the image 500 may be excluded from the region of interest 542. In a particular implementation, the region of interest 542 may be determined by excluding at least a portion of the road, a bottom quarter of the image 500, and a top quarter of the image 500.

Figure 6:
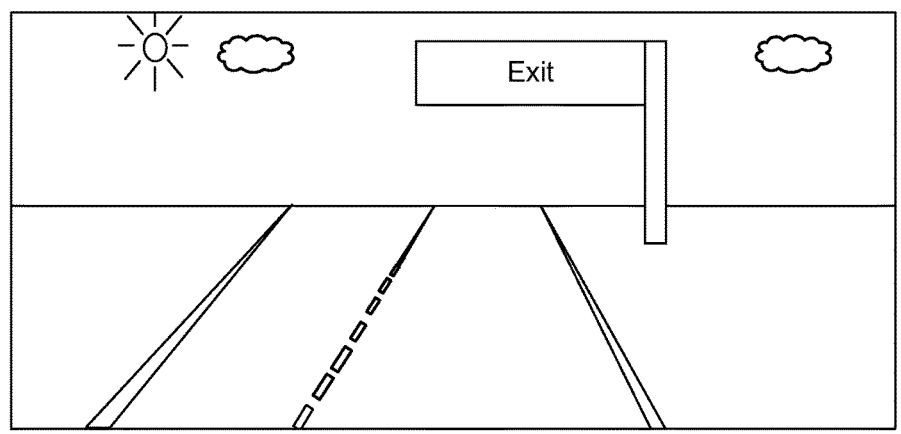
FIG. 6 is a diagram of another particular illustrative example of excluding at least a portion of a road region from an image during object (e.g., sign) detection.
Figure 6:
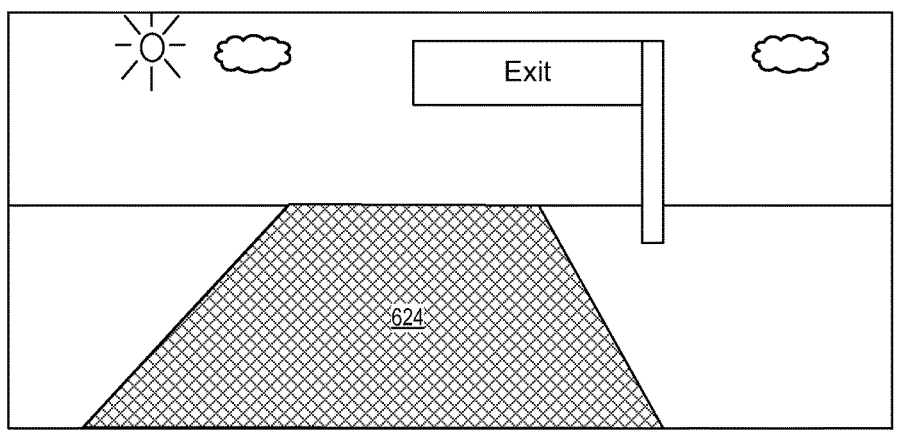

Referring to FIG. 6, an illustrative fourth example of image processing to exclude at least a portion of a road region from an image is depicted. An image including a representation of a road that is associated with a road region, such as the road region 112 of FIG. 1, and an overhead sign (e.g., an exit sign) is depicted at 600. The image 600 may include or correspond to the image 104 of FIG. 1.

A representation of the image 600 is designated 620. The representation 620 includes a region 624 and an ROI 642. The region 624 may include all or a portion of the road region that is in the field of view of the vehicle camera. The ROI 642 may include or correspond to the ROI 122 of FIG. 1. As illustrated in FIG. 6, the region 624 may be excluded from the image 600 to determine the ROI 642. Excluding the region 624 from the image 600 may result in the ROI 642 that includes the overhead sign (e.g., the exit sign). Accordingly, a traffic sign detection operation performed on the ROI 642 may detect the overhead sign.

Figure 7:
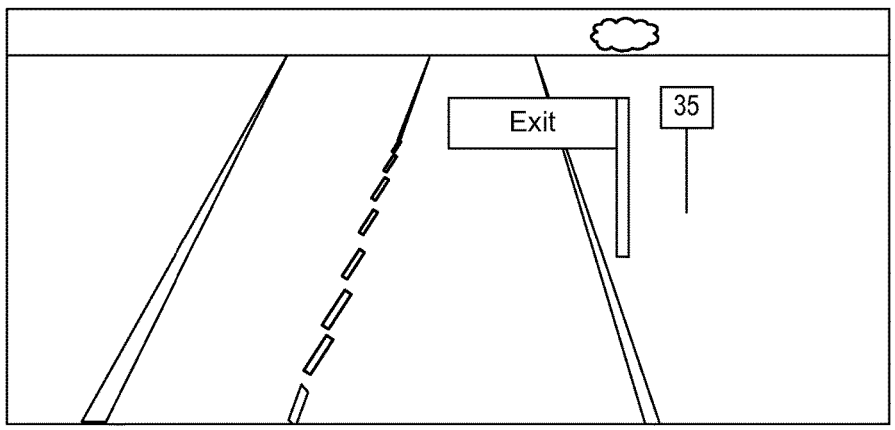
FIG. 7 is a diagram of another particular illustrative example of excluding at least a portion of a road region from an image during object (e.g., sign) detection.
Figure 7:
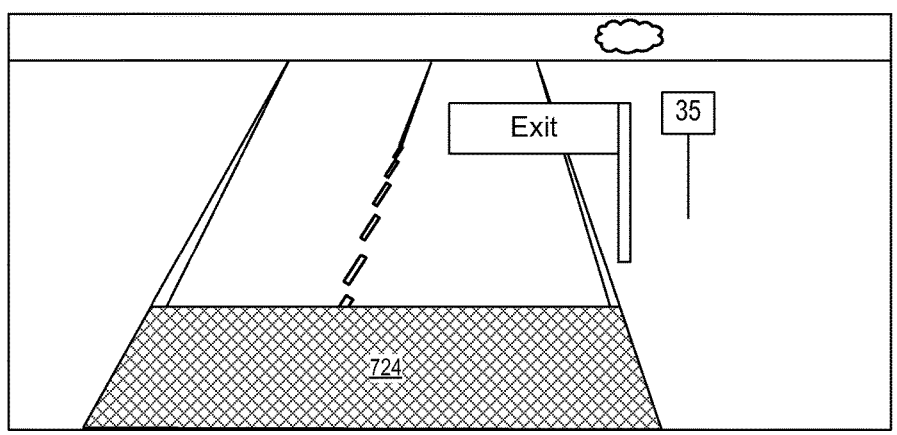

Referring to FIG. 7, an illustrative fifth example of image processing to exclude at least a portion of a road region from an image is depicted. An image including a representation of a road that is associated with a road region, such as the road region 112 of FIG. 1, and an overhead sign (e.g., an exit sign) is depicted at 700. For example, the image 700 may include or correspond to the image 104 of FIG. 1. The overhead sign included in the image 700 may at least partially overlap the road region included in the image 700. In some implementations, the image 700 may depict a field of view of a camera of a vehicle that is traveling in a downhill direction or that is approaching elevated terrain, such as a hill.

A representation of the image 700 is designated 720. The representation 720 includes a region 724 and an ROI 742 (e.g., a subset of the image 700 to be searched for an object). The region 724 may include all or a portion of the road region that is in the field of view of the vehicle camera. In some implementations, the region 724 may be determined to be a portion of the road region or a portion of the image 700 that is closest to the vehicle, such as a bottom portion of the image 700. To illustrate, the region 724 may be determined as a percentage (e.g., 50%) of the road region that is closest to the vehicle or as a percentage (e.g., 20%) of the image 700 that is closest to the vehicle. In other implementations, the portion of the road region may be determined based on data, such as a distance value. For example, referring to FIG. 1, the road region detector 110 may receive depth information that indicates a distance from the vehicle to one or more points or objects included in image 700. Based on the depth information, the road region detector 110 may determine the portion of the road region. To illustrate, the region 724 may be associated with a distance of 100 feet, as an illustrative, non-limiting example. By determining the region 724 as a portion of the road region, an overlap condition between the overhead sign and the road region may be avoided. Accordingly, the ROI 742 may include the overhead sign and object detection performed on the ROI 742 may detect the overhead sign.

Figure 8:
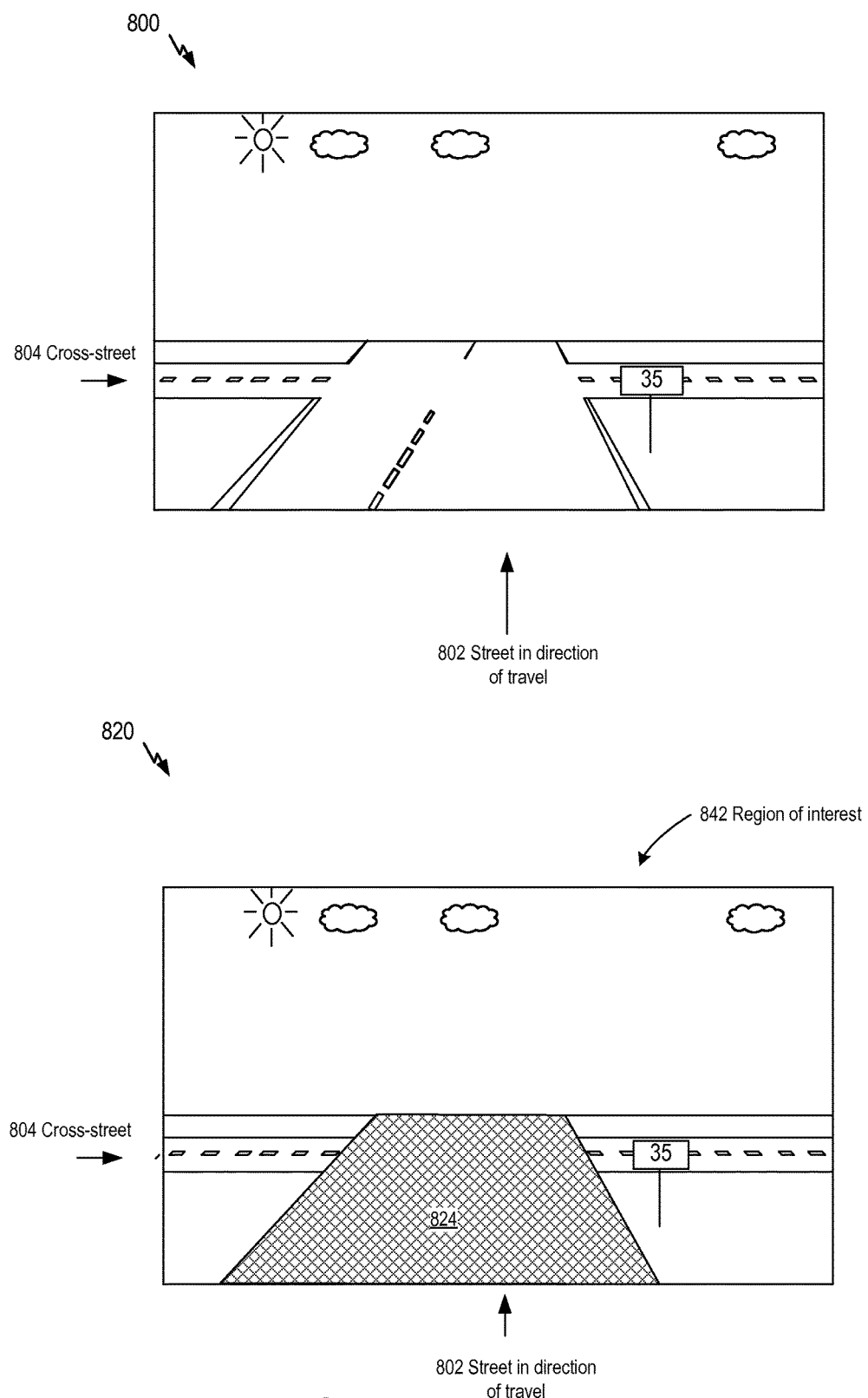
FIG. 8 is a diagram of another particular illustrative example of excluding at least a portion of a road region from an image during object (e.g., sign) detection.

Referring to FIG. 8, an illustrative sixth example of image processing to exclude at least a portion of a road region from an image is depicted. An image including a representation of a road that is associated with a road region, such as the road region 112 of FIG. 1, is depicted at 800. The image 800 may include or correspond to the image 104 of FIG. 1. The road region may include an intersection of a street 802 associated with a direction of travel of a vehicle (e.g., a traffic lane that includes the vehicle) and a cross-street 804. The image 800 may also include a street sign that at least partially overlaps the cross-street 804.

A representation of the image 800 is designated 820. The representation 820 includes a region 824 and an ROI 842. The ROI 642 may include or correspond to the ROI 122 of FIG. 1. In some implementations, the region 824 may only include the portion of the road region (or a traffic lane) that is in a direction of travel of the vehicle. In other implementations, the region 824 may include the portion of the road region (or a traffic lane) in the direction of travel, but not the entire road region, based on mapping data or in response to detecting an intersection between two or more streets that is greater than a threshold size. To illustrate, the region 824 may not include portions of the cross-street 804 that do not overlap the street 802. As illustrated in the representation 820, the region 824 may be excluded from the ROI 842 (e.g., a subset of the image 800). By determining the region 824 to be distinct from portions of the cross-street 804 that do not overlap the street 802, the speed limit sign shown in FIG. 8 may be detectable by an object detection operation.

Figure 9:
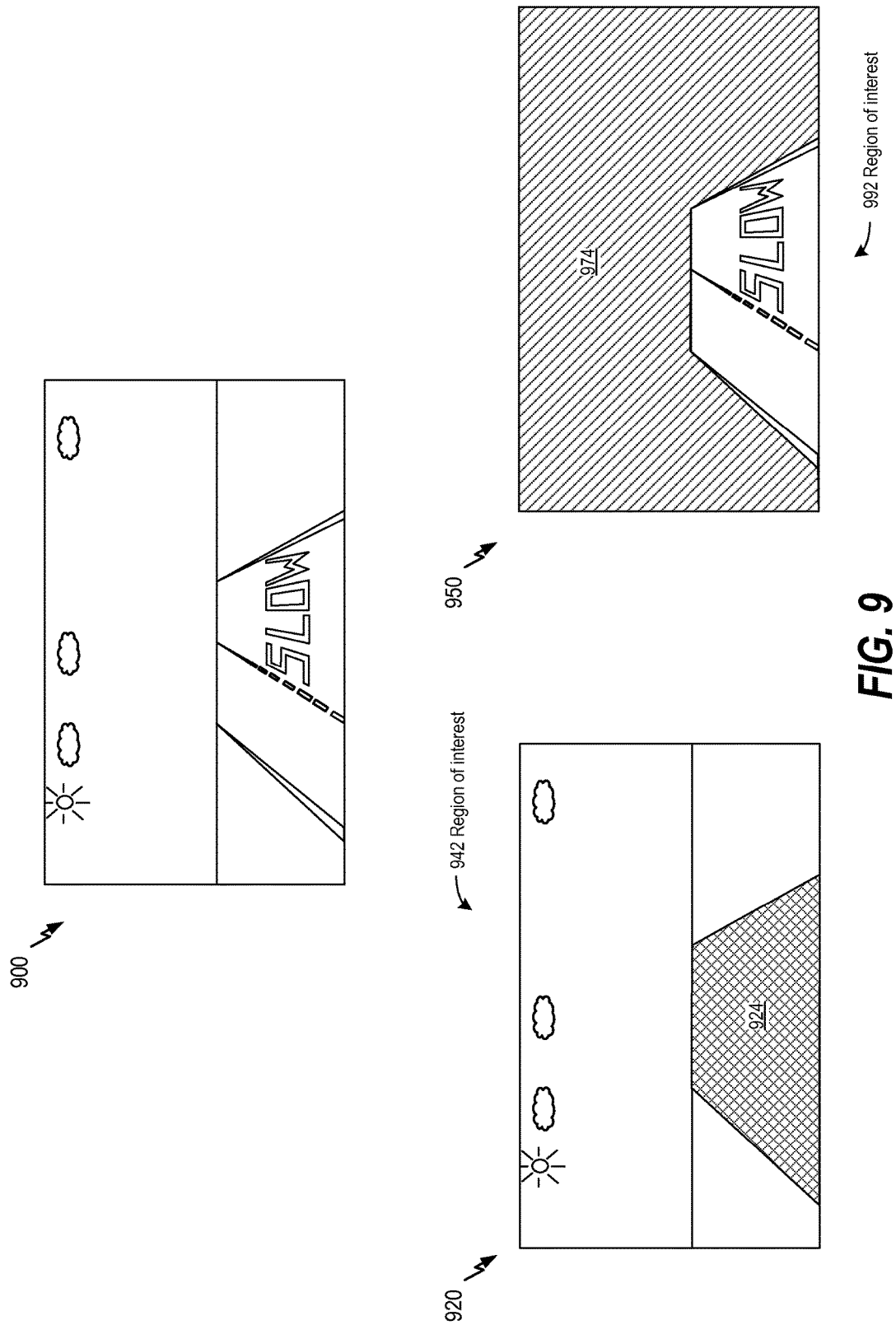
FIG. 9 is a diagram of another particular illustrative example of excluding at least a portion of a road region from an image during object (e.g., sign) detection.

Referring to FIG. 9, an illustrative seventh example of image processing to exclude at least a portion of a road region from an image is depicted. An image including a representation of a road that is associated with a road region, such as the road region 112 of FIG. 1, is depicted at 900. The image 900 may include or correspond to the image 104 of FIG. 1. The road region may include information, such as a warning message, a speed limit, a traffic flow arrow, a road identifier, etc., that is displayed on the road region. In the example of FIG. 9, the image 900 includes the warning message "SLOW" printed on the road region.

A first representation of the image 900 is designated 920. The first representation 920 includes a first region 924 and a first ROI 942 (e.g., a first subset of the image 300 that excludes the first region 924). The first region 924 may include all or a portion of the road region that is in the field of view of the vehicle camera. As illustrated in FIG. 9 the first region 924 may be excluded from the image 900 to determine the first ROI 942.

A second representation 950 depicts a second region 974 and a second ROI 992. The second region 974 and the second ROI 992 may correspond to the first ROI 942 and the first region 924, respectively, of the first representation 920. For example, the second ROI 992 may correspond to the road region of the image 900. The second ROI 992 may exclude the second region 974. A text and/or symbol detection operation may be performed on the second ROI 992 to detect text (e.g., the warning message "SLOW") and/or symbol(s) included in the second ROI 992. In some implementations, one or more lane markers may be removed (e.g., excluded) from the second ROI 992 prior to performing the text detection operation. Removing the one or more lane markers may improve a quality of the text/symbol detection operation.

In some implementations, the region of interest 992 and the first region 924 may be the same or may be different. For example, the region of interest 992 and the first region 924 may be the same size and the same shape. Alternatively, the region of interest 992 and the first region may be a different size, a different shape, or both. To illustrate, the region of interest 992 may include a lane(s) that includes the vehicle or that has traffic in the same direction of travel as the vehicle. The region of interest 992 may exclude a portion(s) of the road region of the image 900 associated with traffic in an opposite direction of the direction of travel of the vehicle.

Additionally or alternatively, the region of interest 992 may exclude one or more lanes that are different than a lane that a vehicle is traveling in. In some implementations, the region of interest 922 may exclude portions of the road region of the image 900 that do not include a lane the vehicle is traveling in or one or more lanes (having traffic in the same direction of travel as the vehicle) that are next to the lane the vehicle is traveling in. By excluding portions of the road region to determine the region of interest 992, text detection (and optionally text recognition) performed on the region of interest 992 may be performed faster than if text detection (and optionally text recognition) were performed on an entirety of the road region of the image 900 or an entirety of the first region 924.

Thus, FIG. 9 illustrates that at least a portion of the road region of the image 900 may be detected (e.g., determined) and used to determine the first ROI 942 that excludes the portion of the road region (e.g., the first region 924). Additionally, the portion of the road region of the image 900 may, itself, be determined as the second ROI 992. An object detection operation (e.g., a traffic sign detection operation) may be performed on the first ROI 942 and a text/symbol detection operation may be performed on the second ROI 992.

Figure 10:
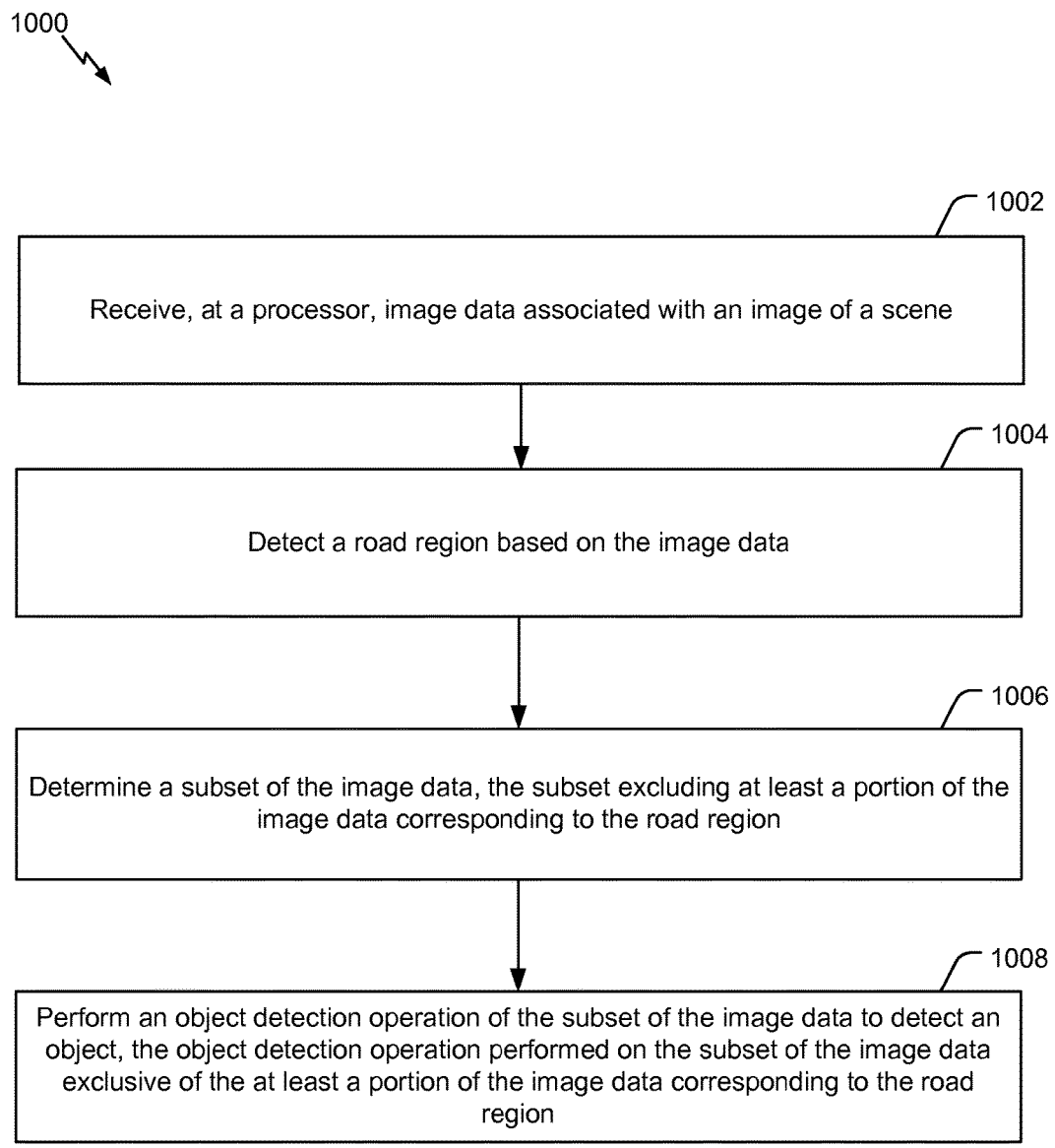
FIG. 10 is a flow diagram that illustrates a particular example of a method of image processing operations for object (e.g., sign) detection.

Referring to FIG. 10, an illustrative aspect of a method 1000 of processing an image is shown. The image may include the image 104 of FIG. 1, the image 300 of FIG. 3, the image 400 of FIG. 4, the image 500 of FIG. 5, the image 600 of FIG. 6, the image 700 of FIG. 7, the image 800 of FIG. 8, or the image 900 of FIG. 9. In an illustrative, non-limiting example, the method 1000 may be performed by the image processing system 100 of FIG. 1 or the image processing system 200 of FIG. 2.

The method 1000 includes receiving, at a processor, image data associated with an image of a scene, at 1002. The image data may include or correspond to the image data 104 of FIG. 1.

The method 1000 includes detecting a road region based on the image data, at block 1004. For example, the road region may include or correspond to the road region 112 of FIG. 1. To illustrate, the image may include a representation of a road and the road region may include a portion or an entirety of the representation of road. Referring to FIG. 1, the road region may be detected by the road region detector 110. The image may be associated with a plurality of pixels and the road region may be associated with a subset of the plurality of pixels. A plurality of pixel values, the subset of the plurality of pixel values, or both, may be stored at a data storage device, such as a memory coupled to or included in the image processing system 100 of FIG. 1 or the image processing system 200 of FIG. 2.

The method 1000 further includes determining a subset of the image data, at block 1006. The subset excludes at least the portion of the image data corresponding to the road region. Determining the subset of the image may be performed at least partially concurrently with or after detecting the road region. For example, the subset of the image may include or correspond to the ROI 122 of FIG. 1, the ROI 342 of FIG. 3, the ROI 442 of FIG. 4, the ROI 542 of FIG. 5, the ROI 642 of FIG. 6, the ROI 742 of FIG. 7, the ROI 842 of FIG. 8, or the ROI 942 of FIG. 9. To illustrate, referring to FIG. 1, the subset of the image, i.e., the ROI 122, may be determined by the ROI generator 120. In some implementations, the subset of the image may also exclude additional portion(s) of the image other than the road region.

The method 1000 further includes performing an object detection operation on the subset of the image data to detect an object, the object detection operation performed on the subset of the image data exclusive of the at least a portion of the image data corresponding to the road region, at block 1008. Stated in different manner, the object detection operation to detect the object may be performed on the subset of the image data and may not be performed on the at least a portion of the image data corresponding to the road region. For example, the object may include or correspond to the candidate object 132 or the indicator 140 of FIG. 1. Referring to FIG. 1, the subset of the image, i.e., the ROI 122 may be searched by the object detector 130 to detect a traffic sign, as an illustrative, non-limiting example. Optionally, an object recognition operation may be performed on the detected object by the object recognizer 134 of FIG. 1

In some implementations, in response to detecting the object within the subset of the image, an indicator associated with the object may be generated and output. For example, the object detector 130 may be configured to output the indicator associated with the detected object. Additionally or alternatively, the object recognizer 134 may optionally be configured to output the indicator 140. The indication output by the object detector 130 or the indicator 140 output by the object recognizer 134 may include information associated with the object (e.g., an object type), a location of the object within the image 104, or both. In some implementations, in response to the indication, the method 1000 may include initiating an additional action, such as an action to be performed by an ADAS or an autonomous vehicle. Additionally or alternatively, in response to the indication, a visual presentation of the indication may be initiated to be presented via a display, HUD, a wearable device (e.g., a head mounted display), an audio presentation of the indication may be initiated to be presented via a speaker or a wearable device (e.g., a head speaker), or both.

The indicator may be used in combination with other information associated with a vehicle or device, such as speed information, location information, obstacle information, etc., as illustrative, non-limiting examples. To illustrate, if a speed limit 45 sign is recognized, outputting the indicator or initiating the action may be dependent on characteristics of vehicle operation, such as a speed characteristic. For example, if speed data indicates an autonomous vehicle is traveling at less than a 45 mile per hour (mph) speed limit and additional obstacle detection information indicates clear driving conditions, the action may increase a speed of the vehicle to the speed limit. Alternatively, if speed data indicates an autonomous vehicle is traveling in excess of a 45 mile per hour (mph) speed limit, the action may decrease a speed of the vehicle to 45 mph or less. In an implementation where the vehicle includes a display or a HUD, a visualization may be presented via the display or the HUD based on the indication, other vehicle information (e.g., vehicle data), or both. For example, if the indicator corresponds to a 45 mph speed limit sign and speed information indicates that a vehicle is traveling at 55 mph, a message indicating the 45 mph speed limit, a message to reduce a vehicle speed to 45 mph, or both may be presented via the display or the HUD. Alternatively, if the vehicle is traveling at 45 mph or less, a message indicating the 45 mph speed limit may be presented or no message may be presented.

In some implementations, the method 1000 may include, after detecting the road region, determining a size of the road region and comparing the size of the road region to a threshold size. In response to the size of the road region being greater than or equal to the threshold size, the method 1000 may include selecting a portion of the road region that is closest to the vehicle for exclusion. In some implementations, the threshold size may be a fixed threshold and, in other implementations, the threshold size may be a dynamic threshold. For example, the threshold size may be selected based on how much the road region being covered, vehicle speed, other criteria, or a combination thereof.

In some implementations, the portion of the road region that is to be excluded may be determined based on the image or distance data (e.g., ultrasound data). To illustrate, a farthest distance of the road region may be determined. The farthest distance may be compared to a threshold distance. If the farthest distance is less than or equal to the distance threshold, an entirety of the road region may be excluded from the image to determine the subset of the image (e.g., the ROI 122). Alternatively, if the farthest distance is greater than (e.g., exceeds) the threshold distance, a bottom portion of the road region that extends to a distance that is less than or equal to the threshold distance may be determined. The bottom portion of the road region (as depicted in the image) may be selected as the portion of the road region to be excluded.

In some implementations, another portion (in addition to at least the portion of the road region) of the image may be excluded to determine the subset. For example, the other portion of the image may be excluded as described at least with reference to FIGS. 1, 2, 4, 5, 7, and 8. For example, the ROI generator 120 of FIG. 1 may be configured to apply one or more of the techniques, individually or in combination, as described at least with reference to FIGS. 1, 2, 4, 5, 7, and 8. To illustrate, the ROI generator 120 may exclude a portion of the image that is closest to the vehicle and a region of the image above the road region. The other portions of the image to be excluded (e.g., the one or more techniques to be applied) may be determined based on vehicle information, location information, mapping information, etc., as described herein. In some implementations, the ROI generator 120 may cycle through multiple techniques to exclude other portions of the image. For example, the ROI generator 120 may apply a first technique (e.g., removing a portion of the image closest to the vehicle) during processing of a first image or a first group of images and may apply a second technique (e.g., removing a portion of the image above the road region) during processing of a second image or a second group of images.

In some implementations, the method 1000 may include selecting the at least a portion of the image data corresponding to the road region and removing at least the portion of the road region from the image to determine the subset of the image. In a particular implementation, an entirety of the road region may be removed (e.g., excluded) from the image to determine the subset of the image. The at least the portion of the image data corresponding to the road region removed from the image may correspond to a portion of the road region that is closest to the vehicle, as described above with reference to FIG. 7. The portion of the road region determined to be closest to the vehicle may correspond to a particular value, such as a distance from the vehicle, a number of pixel rows of the image, a fraction (e.g., a fractional area) of the image, a percentage of the image, etc., as illustrative, non-limiting examples. Additionally or alternatively, excluding at least the portion of the image data corresponding to the road region from the image may include overwriting a set of pixel values that correspond to at least the portion of the road region and that are stored in a memory coupled to or included in the image processing system 100 of FIG. 1 or the image processing system 200 of FIG. 2.

In some implementations, determining the subset of the image may include excluding the portion of the road region from the image to generate a first subset of the image. After generating the first subset of the image, a second portion of the first subset of the image may be determined. The second portion of the first subset may be distinct from (e.g., non-overlapping with) a bottom portion of the image. The second portion (of the first subset) may be selected as the subset of the image that is searched to detect the object.

In some implementations, the method 1000 may include performing a second object detection operation on the image data to detect the road region. The second object detection operation may be associated with a first search window at a first search resolution. The object detection operation performed on the subset of the image data may be associated with a second search window at a second resolution to detect the object. The first resolution may be a lower resolution than the second resolution. In some implementations, text and/or symbol detection may be performed on at least a second portion of the image data corresponding to the road region. The text detection operation may be associated with a third search window at a third resolution. The third resolution may be a lower resolution than the second resolution. The text detection may be performed on an entirety of the road region, or a portion thereof. In implementations in which text detection is performed, a text detection operation may be performed on an entirety of the road region or a portion of the road region. The portion of the road region may be the same as or different than a portion of the road region excluded from the image to determine the subset of the image.

In some implementations, searching the subset of the image may include detecting a candidate object included in the subset of the image. Object recognition may be performed on the detected candidate object to recognize the candidate object as the object. After the object is detected or recognized, an image quality characteristic, based on the image of the object may be determined. The image quality characteristic may be compared to a threshold image quality characteristic, such as a known quality value of the object. If the image quality characteristic of the object is less than or equal to the threshold image quality characteristic, a parameter update related to the image quality characteristic may be determined. The parameter update may be applied to a second image that is received after receipt of the image. The parameter update may be associated with a color tuning parameter, a white balance parameter, a brightness parameter, or a combination thereof.

The method 1000 thus enables determining and excluding a subset(s) of an image from further image processing operations. For example, by excluding at least a portion of a road region from an image that is searched for the object (e.g., a traffic sign), the object search may be performed more quickly than if the entire image were searched. Additionally, by searching less than the entire image, the image processing system may perform object detection, and optionally object recognition, more quickly.

The process shown in the method 1000 of FIG. 10 may be controlled by a processing unit such as a central processing unit (CPU), a controller, a field-programmable gate array (FPGA) device, an application-specific integrated circuit (ASIC), another hardware device, firmware device, or any combination thereof. As an example, the method 1000 of FIG. 10 can be performed by one or more processors that execute instructions to process an image to determine (e.g., select) a subset of an image, the subset excluding at least a portion of a road region of the image.

Figure 11:
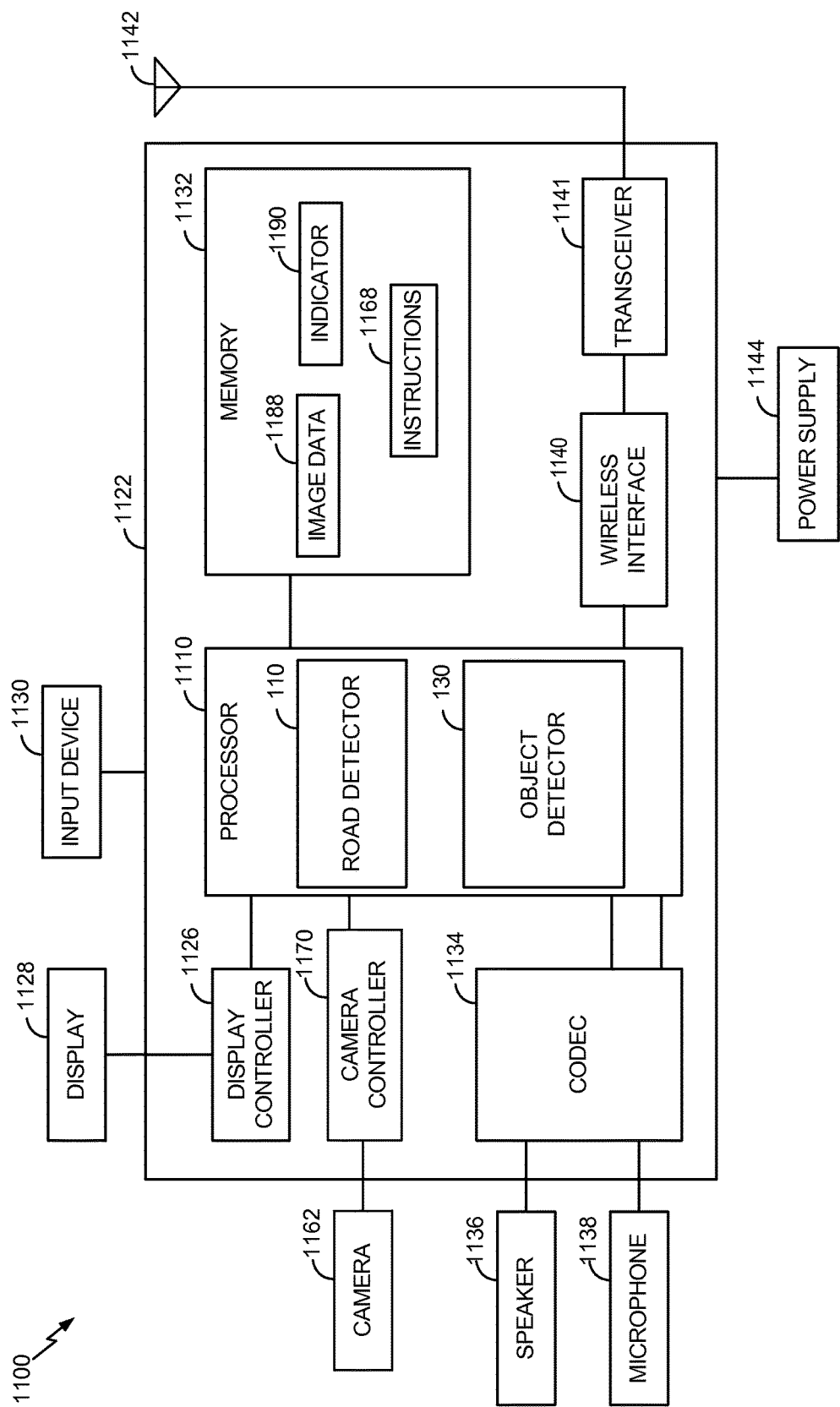
FIG. 11 is a diagram of an electronic device that is operable to support various aspects of one or more methods, systems, apparatuses, and/or computer-readable media disclosed herein.

Referring to FIG. 11, a particular illustrative aspect of an electronic device is depicted and generally designated 1100. The device 1100 includes a processor 1110, such as a digital signal processor (DSP), central processing unit (CPU), etc., coupled to a memory 1132. The device 1100, or components thereof, may include or correspond to the image processing system 100 (e.g., the computing device 102) of FIG. 1, the image processing system 200 (e.g., the computing device 202) of FIG. 2, or components thereof.

Memory 1132, such as a non-transitory computer readable medium, may include image data 188, the indicator 1190, and instructions 1168. The image data 1188 may include or correspond to one or more images, such as the image 104 of FIG. 1. The indicator 1190 may be associated with an object, such as a traffic sign, based on the image data 1188. In some implementations, the indicator 1190 may include or correspond to the indicator 140 of FIG. 1 or an indicator (associated with a detected object) that is generated by the object detector 130 of FIG. 1. The instructions may be executable by the processor 1110.

The processor 1110 may include the road region detector 1110 and the object detector 130. In some implementations, the processor 1110 may optionally include the object recognizer 134. Additionally or alternatively, the processor 1110 may include the ROI generator 120 of FIG. 1, the image pre-processor 216, the color tuner 260, the controller 250 of FIG. 2, or a combination thereof. The processor 1110 may be configured to execute software (e.g., a program of one or more instructions 1168) stored in the memory 1132. For example, the processor 1110 may be configured to operate in accordance with the method 1000 of FIG. 10. To illustrate, the processor 1110 may be configured to execute the instructions 1168 that cause the processor 1110 to perform operations including in response to receiving an image of a scene, detecting a road region within the image. The operations further include determining (e.g., selecting) a subset of the image. The subset may exclude at least a portion of the road region. The operations further include searching the subset of the image exclusive of the at least a portion of the road region to detect an object.

FIG. 11 also shows a display controller 1126 that is coupled to the processor 1110 and to a display 1128. In some implementations, the display 1128 may include a heads-up display (HUD). A coder/decoder (CODEC) 1134 can also be coupled to the processor 1110. A speaker 1136 and a microphone 1138 can be coupled to the CODEC 1134. The processor 1110 may also be coupled to a camera controller 1160 that is coupled to a camera 1162 (e.g., an image capture device). For example, the camera 1162 may include or may correspond to the image sensor 214 of FIG. 2. In some implementations, the device 1100 includes a single image capture device. In other implementations, the device 1100 may include multiple image capture devices.

FIG. 11 also indicates that a wireless interface 1140 can be coupled to the processor 1110 and to an antenna 1142. For example, the wireless interface 1140 may be coupled to the antenna 1142 via a transceiver 1141. The transceiver 1141 may include a transmitter, a receiver, or both. The transceiver 1141 may be configured to transmit one or more messages generated by the device 1100 and to receive one or more messages transmitted to the device 1100 by other devices, such as other vehicles, road-side units, mobile devices, access points, location information, etc. For example, the transmitter may be configured to transmit a message (e.g., a notification) that includes the indicator 1190. The message (e.g., the notification) may be generated by the processor 1110, as an illustrative, non-limiting example. In some implementations, the electronic device 1100 may include a positioning system, such as a global positioning system (GPS), that is configured to determine location information of the electronic device. The location information may be used in combination with mapping data, such as mapping data that may be stored at the memory 1132, to determine whether the electronic device 1100 is approaching an incline or a decline, is approaching an intersection, is in an urban area, is in a rural area, is next to a body of water, etc., as illustrative, non-limiting examples. The location information may be stored in the memory 1132, included in the message (e.g., the notification) that includes the indicator 1190, or both.

In some implementations, the processor 1110, the display controller 1126, the camera controller 1170, the memory 1132, the CODEC 1134, the wireless interface 1140, and the transceiver 1141 are included in a system-in-package or system-on-chip device 1122. In a particular implementation, an input device 1130 and a power supply 1144 are coupled to the system-on-chip device 1122. Moreover, in another particular implementation, as illustrated in FIG. 11, the display 1128, the camera 1162, the input device 1130, the speaker 1136, the microphone 1138, the antenna 1142, and the power supply 1144 are external to the system-on-chip device 1122. However, each of the display 1128, the camera 1162, the input device 1130, the speaker 1136, the microphone 1138, the antenna 1142, and the power supply 1144 can be coupled to a component of the system-on-chip device 1122, such as an interface or a controller.

In conjunction with one or more of the described aspects of FIGS. 1-11, an apparatus includes means for capturing an image of a scene. For example, the means for capturing may include or correspond to the computing device 102, the image sensor 214 of FIG. 2, the camera 1162, the input device 1130 of FIG. 11, one or more other structures, devices, circuits, modules, or instructions to capture an image, or any combination thereof.

The apparatus also includes means for selecting a subset of the image. The subset may exclude at least a portion of a road region detected in the image. For example, the means for selecting may include or correspond to the computing device 102, the ROI generator 120 of FIG. 1, the computing device 202 of FIG. 2, the processor 1110 programmed to execute the instructions 1168 of FIG. 11, one or more other structures, devices, circuits, modules, or instructions to identify the subset of the image, or any combination thereof.

The apparatus also includes means for performing an object detection operation on the subset of the image exclusive of the at least a portion of the road region to detect an object. For example, the means for performing may include or correspond to the computing device 102, the object detector 130, the object recognizer 134 of FIG. 1, the computing device 202 of FIG. 2, the processor 1110 programmed to execute the instructions 1168 of FIG. 11, one or more other structures, devices, circuits, modules, or instructions to perform the object detection operation, or any combination thereof. The means for capturing, the means for selecting, and the means for performing may be included in a vehicle, such as a car, as an illustrative, non-limiting example.

Additionally or alternatively, the apparatus may also include means for providing an indication associated with the object. For example, the means for providing may include or correspond to the capture device 102, the object detector 130, the object recognizer 134 of FIG. 1, the computing device 202, the controller 256 of FIG. 2, the wireless interface 1140, the transceiver 1141, the antenna 1142, the speaker 1136, the microphone 1138, a HUD, the display 1128, the processor 1110 programmed to execute the instructions 1168 of FIG. 11, one or more other structures, devices, circuits, modules, or instructions to provide the indication, or any combination thereof.

Although one or more of FIGS. 1-11 may illustrate systems, apparatuses, and/or methods according to the teachings of the disclosure, the disclosure is not limited to these illustrated systems, apparatuses, and/or methods. One or more functions or components of any of FIGS. 1-11 as illustrated or described herein may be combined with one or more other portions of another function or component of FIGS. 1-11. Accordingly, no single example described herein should be construed as limiting and examples of the disclosure may be suitably combined without departing from the teachings of the disclosure.

Those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of processing an image, the method comprising:

receiving, at a processor, image data associated with an image of a scene;
detecting a road region based on the image data;
determining a size of the road region;
identifying at least a portion of the image data corresponding to the road region based on a comparison of the size of the road region to a threshold size;
determining a subset of the image data, the subset excluding the at least a portion of the image data corresponding to the road region; and
performing an object detection operation on the subset of the image data to detect an object, the object detection operation performed on the subset of the image data exclusive of the at least a portion of the image data corresponding to the road region.

2. The method of claim 1, further comprising:
selecting the at least a portion of the image data corresponding to the road region; and
removing the at least a portion of the image data corresponding to the road region to determine the subset of the image data.

3. The method of claim 2, wherein removing the at least a portion of the image data corresponding to the road region includes overwriting at least a portion of the image data with a predetermined value.

4. The method of claim 1, further comprising, in response to the size of the road region being greater than or equal to the threshold size, excluding the at least a portion of the image data corresponding to the road region to determine the subset of the image data.

5. The method of claim 4, wherein a size of the road region is less than or equal to the threshold size.

6. The method of claim 1, further comprising:
determining, based on the image data, whether the road region extends beyond a threshold distance; and
in response to determining that the road region extends beyond the threshold distance:
determining a portion of the road region that extends to a distance that is less than or equal to the threshold distance; and
excluding the portion of the image data corresponding to the portion of the road region to determine the subset of the image data.

7. The method of claim 1, wherein the subset further excludes a second portion of the image data that is distinct from the at least a portion of the image data corresponding to the road region.

8. The method of claim 1, wherein the subset of the image data excludes a portion of the image data corresponding to a region of the image that is adjacent to the road region.

9. The method of claim 1, wherein detecting the road region comprises performing a second object detection operation on the image data to detect the road region, the second object detection operation associated with a first search window at a first resolution, wherein the object detection operation performed on the subset of the image data is associated with a second search window at a second resolution to detect the object, and wherein the first resolution is a lower resolution than the second resolution.

10. The method of claim 1, wherein the object detection operation performed on the subset of the image data is associated with a first search window at a first resolution to detect the object, and further comprising performing a text detection operation on the image data, wherein the text detection operation is associated with a second search window at a second resolution, and wherein the second resolution is different resolution than the first resolution.

11. The method of claim 1, further comprising, in response to detecting the object based on the subset of the image data, initiating an action.

12. The method of claim 11, wherein the action comprises providing an indication associated with the detected object or changing an operating characteristic of a vehicle.

13. The method of claim 1, wherein the size of the road region is based on a contour of the road region, and wherein the contour of the road region comprises a shape of an upper boundary of the road region.

14. The method of claim 1, further comprising performing an object recognition operation on at least a particular portion of the image data including the detected object.

15. A device comprising:
an image sensor configured to generate an image of a scene; and
a processor configured to:
receive the image;
detect a road region of the image;
determine a size of the road region;
identify at least a portion of the image corresponding to the road region based on a comparison of the size of the road region to a threshold size;
determine a subset of the image, the subset excluding the at least a portion of the road region; and
perform an object detection operation on the subset of the image to detect an object, the object detection operation performed on the subset of the image exclusive of the at least a portion of the road region.

16. The device of claim 15, wherein the processor is further configured to search the subset of the image using a first search window and to search the at least a portion of the road region using a second search window, and wherein each of the first search window and the second search window correspond to a different resolution.

17. The device of claim 15, wherein the processor is further configured to select at least a second portion of the image and to perform a text detection operation on the at least a second portion of the image.

18. The device of claim 15, wherein the subset excludes an entirety of the road region.

19. The device of claim 15, wherein the processor is further configured to, in response to the object being detected within the subset of the image, initiate an action.

20. The device of claim 19, wherein the action comprises providing an indication of the detected object or changing an operating characteristic of a vehicle.

21. The device of claim 15, wherein, to detect the road region, the processor is configured to search the image using a first search window at a first resolution, wherein the subset of the image is searched using a second search window at a second resolution to detect the object, and wherein the first resolution is a lower resolution than the second resolution.

22. The device of claim 21, wherein the processor is further configured to perform text detection on at least a second portion of the road region.

23. The device of claim 22, wherein a first size of the at least a portion of the road region is smaller than a second size of the at least a second portion of the road region.

24. A computer readable storage device storing instructions that, when executed by a processor cause the processor to perform operations including:
in response to receiving an image of a scene, detecting a road region within the image;
determining a size of the road region;
identifying at least a portion of the image corresponding to the road region based on a comparison of the size of the road region to a threshold size;
determining a subset of the image, the subset excluding the at least a portion of the road region; and
searching the subset of the image exclusive of the at least a portion of the road region to detect an object.

25. The computer readable storage device of claim 24, wherein the operations further comprise:
detecting a candidate object included in the subset of the image; and
performing object recognition on the candidate object.

26. The computer readable storage device of claim 24, wherein the operations further include, in response to detecting the object within the subset of the image, providing an indication corresponding to the detected object or changing an operating characteristic of a vehicle.

27. The computer readable storage device of claim 24, wherein the subset further excludes a second portion of the image that is distinct from the road region.

28. An apparatus comprising:
means for capturing an image of a scene;
means for determining a size of a road region of the image;
means for identifying at least a portion of the image corresponding to the road region based on a comparison of the size of the road region to a threshold size;
means for selecting a subset of the image, the subset excluding the at least a portion of the road region detected in the image; and
means for performing an object detection operation on the subset of the image exclusive of the at least a portion of the road region to detect an object.

29. The apparatus of claim 28, further comprising means for providing an indication associated with the object.

30. The apparatus of claim 28, wherein the means for capturing, the means for selecting, and the means for performing are associated with a vehicle.

31. A method of processing an image, the method comprising:
receiving, at a processor, image data associated with an image of a scene;
detecting a road region based on the image data;
determining a subset of the image data, the subset excluding the at least a portion of the image data corresponding to the road region;
performing an object detection operation on the subset of the image data to detect an object, wherein the object detection operation is performed on the subset of the image data exclusive of the at least a portion of the image data corresponding to the road region, and wherein the object detection operation is associated with a first search window at a first resolution; and
performing a text detection operation on the image data, wherein the text detection operation is associated with a second search window at a second resolution, and wherein the second resolution is different than the first resolution.

32. The method of claim 31, further comprising:
determining, based on the image data, whether the road region extends beyond a threshold distance; and
in response to determining that the road region extends beyond the threshold distance:
determining a portion of the road region that extends to a distance that is less than or equal to the threshold distance; and excluding the portion of the image data corresponding to the portion of the road region to determine the subset of the image data.

33. The method of claim 31, wherein the subset further excludes a second portion of the image data that is distinct from the at least a portion of the image data corresponding to the road region.

34. The method of claim 33, wherein the subset of the image data excludes a portion of the image data corresponding to a region of the image that is adjacent to the road region.

35. The method of claim 31, wherein detecting the road region comprises performing a second object detection operation on the image data to detect the road region, the second object detection operation associated with a third search window at a third resolution, and wherein the third resolution is a lower resolution than the first resolution.

36. The method of claim 31, further comprising, in response to detecting the object based on the subset of the image data, initiating an action.

37. The method of claim 36, wherein the action comprises providing an indication associated with the detected object or changing an operating characteristic of a vehicle.

38. The method of claim 31, wherein the size of the road region is based on a contour of the road region, wherein the contour of the road region comprises a shape of an upper boundary of the road region.

39. The method of claim 31, further comprising performing an object recognition operation on at least a particular portion of the image data including the detected object.

40. A device comprising:
  an image sensor configured to generate an image of a scene; and
  a processor configured to:
    receive the image;
    detect a road region of the image;
    determine a subset of the image, the subset excluding the at least a portion of the road region;
    perform an object detection operation on the subset of the image to detect an object, the object detection operation performed on the subset of the image exclusive of the at least a portion of the road region, and wherein the object detection operation is associated with a first search window at a first resolution; and
    perform a text detection operation on the image, wherein the text detection operation is associated with a second search window at a second resolution, and wherein the second resolution is different than the first resolution.

41. The device of claim 40, wherein the processor is further configured to search the subset of the image using the first search window and to search the at least a portion of the road region using a third search window, and wherein each of the first search window and the third search window correspond to a different resolution.

42. The device of claim 40, wherein the subset excludes an entirety of the road region.

43. The device of claim 40, wherein the processor is further configured to, in response to the object being detected within the subset of the image, initiate an action.

44. The device of claim 43, wherein the action comprises providing an indication of the detected object or changing an operating characteristic of a vehicle.

45. The device of claim 40, wherein, to detect the road region, the processor is configured to search the image using the first search window at the first resolution, wherein the subset of the image is searched using a third search window at a third resolution to detect the object, and wherein the first resolution is a lower resolution than the third resolution.

46. The device of claim 40, wherein the processor is further configured to perform text detection on the subset of the image.

* * * * *